US010469586B2

(12) United States Patent
Potter et al.

(10) Patent No.: US 10,469,586 B2
(45) Date of Patent: Nov. 5, 2019

(54) HOST-RADIO EXCHANGE INTERFACE FOR RAILROAD COMMUNICATIONS AND RAILROAD COMMUNICATIONS METHODS USING THE SAME

(71) Applicant: Meteorcomm LLC, Renton, WA (US)

(72) Inventors: Timothy J. Potter, Seattle, WA (US); Hamid Farhoosh, Yarrow Point, WA (US); Juha O. Juntunen, Renton, WA (US); James M. Elder, Seattle, WA (US); Suzanne C. Eckardt, Seattle, WA (US)

(73) Assignee: Meteorcomm LLC, Renton, WA (US)

( * ) Notice: Subject to any disclaimer, the term of this patent is extended or adjusted under 35 U.S.C. 154(b) by 615 days.

(21) Appl. No.: 15/012,351

(22) Filed: Feb. 1, 2016

(65) Prior Publication Data

US 2016/0227592 A1 Aug. 4, 2016

Related U.S. Application Data

(60) Provisional application No. 62/110,996, filed on Feb. 2, 2015.

(51) Int. Cl.
*H04L 29/08* (2006.01)
*H04W 60/00* (2009.01)

(52) U.S. Cl.
CPC .............. *H04L 67/12* (2013.01); *H04W 60/00* (2013.01)

(58) Field of Classification Search
CPC ......... H04W 76/02; H04L 67/12; B61L 27/00
See application file for complete search history.

(56) References Cited

U.S. PATENT DOCUMENTS

| 2011/0075641 A1* | 3/2011 | Siriwongpairat ... B61L 27/0005 370/337 |
| 2013/0107813 A1* | 5/2013 | Siriwongpairat ... B61L 27/0005 370/328 |

* cited by examiner

*Primary Examiner* — Kibrom T Hailu
(74) *Attorney, Agent, or Firm* — Hubbard Johnston, PLLC

(57) ABSTRACT

A method of exchanging messages between a railroad communications system radio operating in accordance with a host-radio exchange protocol and a railroad messaging system. A communications manager of the railroad messaging system, operating in accordance with the host-radio exchange protocol, transmits a request to the radio requesting registration as a host of the radio. The communications manager is selectively registered with the radio as a primary host. The radio sends a message to the primary host identifying an available wireless link between the radio and another radio of the railroad communications system. Data messages, which include data being exchanged between the primary host and the primary host of the another radio across the wireless link, are exchanged between the radio and the primary host in accordance with the host-radio exchange protocol.

23 Claims, 18 Drawing Sheets

HOST-RADIO EXCHANGE INTERFACE FOR RAILROAD COMMUNICATIONS AND RAILROAD COMMUNICATIONS METHODS USING THE SAME

CROSS-REFERENCE TO RELATED APPLICATIONS

The present application claims the benefit of U.S. Provisional Patent Application Ser. No. 62/110,996, filed Feb. 2, 2015, which is incorporated herein by reference for all purposes.

The following co-pending and co-assigned application contains related information and is hereby incorporated by reference for all purposes:

U.S. patent application Ser. No. 14/588,959, filed Dec. 3, 2014, for Systems and Methods for Interfacing a Railroad Centralized Traffic Control Wayside and a Railroad Centralized Traffic Control Office Using Interoperable Train Control Messaging.

FIELD OF INVENTION

The present invention relates in general to railroad communications systems, and in particular to a host-radio exchange interface for railroad communications and railroad communications methods using the same.

BACKGROUND OF INVENTION

In any transportation industry, reliable communications systems are mandatory for avoiding serious, if not catastrophic, accidents. In the particular case of the railroads, the railroad central offices normally communicate through wired telecommunications links with a network of radio base stations, which are typically dispersed over very large geographical areas. The radio base stations in turn maintain wireless communication links with locomotives, service vehicles, and wayside systems operating within the base station coverage areas.

In designing and operating a communications system for a transportation industry, a number of different constraints must be addressed. In the railroad industry, for example, a reliable and efficient communications system must be capable of handling different types of information, including data transmitted from the railroad central office and wayside systems to the locomotive on-board computers, as well as voice transmissions between train crews and the central office.

SUMMARY OF INVENTION

The principles of the present invention are embodied in a method of exchanging messages between a railroad communications system radio operating in accordance with a host-radio exchange protocol and a railroad messaging system. A communications manager of the railroad messaging system, operating in accordance with the host-radio exchange protocol, transmits a request to the radio requesting registration as a host of the radio. The communications manager is selectively registered with the radio as a primary host. The radio sends a message to the primary host identifying an available wireless link between the radio and another radio of the railroad communications system. Data messages, which include data being exchanged between the primary host and the primary host of the another radio across the wireless link, are exchanged between the radio and the primary host in accordance with the host-radio exchange protocol.

In more specific embodiments, the method includes registering another requesting communications manager with the radio as a backup host, to which the radio fails-over in event of a disconnection from the primary host from the radio, de-registration of the primary host, or a failure of the primary host. Advantageously, the method ensures that the connection manager requesting registration as a backup host is operating from a version of the host-radio exchange protocol that is at least as high as the version of the host-radio exchange protocol from which the primary host is operating from. Furthermore, embodiments of the principles of the present invention also ensure that the version of the link protocol, used by the primary host and the primary host of the other radio in communication with the radio across the wireless link, used by the backup host is at least as great at that of the primary host.

In addition, on a fail-over from the primary host to the backup host, the method ensures that the another radio and its primary host are operating from a version of the host-radio exchange protocol, as well as the link protocol, which is at least as high as that used by the backup host. Finally, embodiments of the present principles advantageously ensure that the primary host of the radio and the primary host of the other radio on the other side of the wireless link are operating from compatible versions of the link protocol.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-10 of the drawings, in which like numbers designate like parts.

Figure 1:
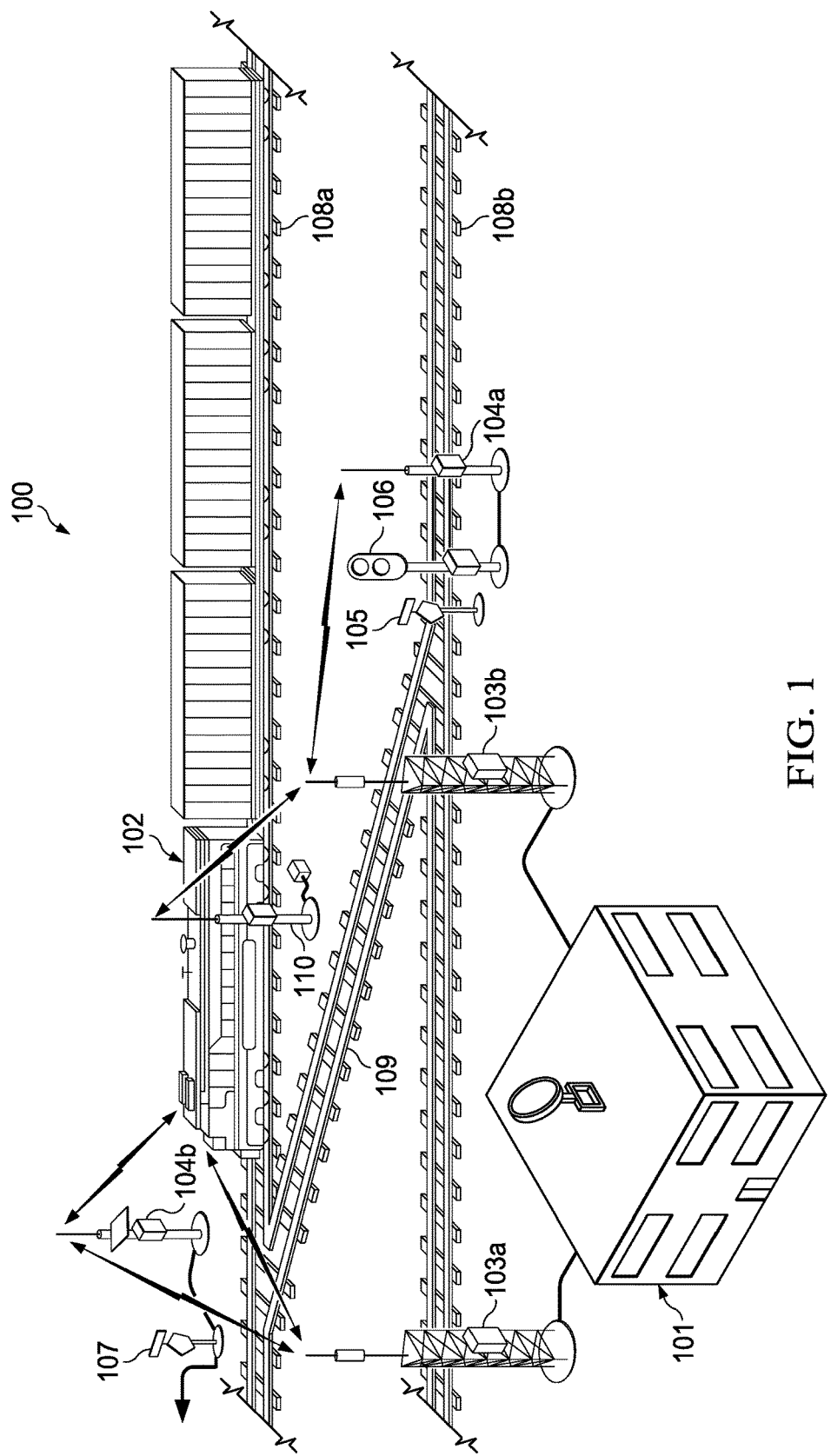
FIG. 1 is high-level diagram showing a small portion of a railroad communications system suitable for practicing the principles of the present invention.

FIG. 1 is high-level diagram showing a small portion of a railroad communications system 100 embodying the principles of the present invention. Generally, communications system 100 supports wireless communications between a central office (network operating center) 101 and locomotives 102 and other railroad vehicles located at various points around a rail system, as well as direct communications between locomotives 102 and the electronic wayside monitoring subsystems.

In communications system 100, central office 101 communicates with packet data radios on locomotives 102 through a wired telecommunications network and a series of packet radio base stations dispersed over thousands of square miles of geographical area through which the rail system operates. In the diagram of FIG. 1, two radio base stations 103a and 103b are shown for discussion purposes.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101, though base stations 103. FIG. 1 shows two representative wayside monitoring subsystems 104a and 104b. As examples of typical uses of wayside monitoring subsystems 104, wayside monitoring subsystem 104a is shown monitoring a switch 105 and a signal 106, and wayside monitoring subsystem 104b is shown monitoring a hand-throw switch 107. Also for illustrative purposes, two parallel sections of track 108a and 108b and a connecting section 109 are shown in FIG. 1, which represent only a very small part of the overall track system.

For IPTC applications, the FCC has allocated frequency channels in the 222 MHz band for providing all data communication paths for wireless communication in the IPTC system. In particular, the frequency channels in the 220 MHz band are paired into base radio frequency channels and mobile radio frequency channels, with each base radio transmit frequency taken from the 220-221 MHz range and paired with a mobile radio frequency from the 221-222 MHz range. Currently, according to FCC regulations, a mobile radio may transmit or receive on either a mobile radio or base radio frequency, while a base radio can transmit only on a base radio frequency.

Generally, "remote" radios means radios disposed on locomotives 102 and other railroad vehicles (i.e., mobile radios), the radios at waysides 104 (i.e., fixed radios), and other radios geographically separated from central office 101 and which are not radios at base stations 103.

In order to support the various messaging and asset management systems, discussed further below, communications system 100 maintains various communications paths between the often widely-spaced fixed and mobile nodes. For example, a communication path must be maintained between mobile remote radios on locomotives 102 and central office 101 to support the exchange of such information as locomotive location reports, locomotive health and diagnostic data, movement authorities, files, and network management data. Another communication path must be established between the mobile remote radios on railroad non-locomotive vehicles (not shown) and the central office 101. The data traffic in this path includes vehicle location reports, work reports, email, and material requisitions.

Another set of communication paths are required for maintaining communications with the fixed remote radios at railroad waysides 104. In this case, a communication path is required between the radios at waysides 104 and central office 101 for supporting signal system health and status monitoring, centralized control of control points, and wayside defect detector system data and alarms. A further communication path is required between the mobile radios on locomotives 102 and the radios at waysides 104, which transmits wayside status updates provided to locomotives 102 in the proximity of a given set of waysides Finally, another communications path is required between the mobile remote radios on locomotives 102 and non-locomotive railroad vehicles and the mobile remote radios on other locomotives 102 and non-locomotive railroad vehicles. This path supports peer-to-peer proximity position reports so that one mobile radio is aware of the locations of nearby mobile radios.

Using a combination of hardwired and wireless links, communications system 100 supports various messaging and asset management functions, including Centralized Traffic Control (CTC), Interoperative Positive Train Control (IPTC), the Interoperable Train Control System Management (ITCSM) system, and the Systems Management System (SMS). A more detailed description of a preferred embodiment of communications system 100 suitable for practicing the present principles is found in U.S. Pat. No. 8,340,056, which is incorporated herein by reference for all purposes.

Generally, CTC is a well-known system in the railroad industry that allows a dispatcher at a central dispatch office to monitor and control interlockings and traffic flow within a designated territory. Among other things, depending on the circumstances, a CTC system may allow a dispatcher to directly control the signal indications giving train movement authorities for a block of track or to directly control switches. A CTC system may also collect status information from subsystems such as signals, switches, waysides, rail integrity/track circuits, and hazard detectors and then ensure that the proper signals and switches are properly set before and during a train movement through a track block.

A Positive Train Control (PTC) system is designed for the express purpose of preventing train-to-train collisions, over-speed derailments, incursions into established work zone limits, and the movement of a train through a switch left in the wrong position. An interoperable PTC (IPTC) system generally allows locomotives of a host railroad and a tenant railroad to communicate with and respond to the PTC system, while supporting uninterrupted movements over property boundaries.

The computerized Interoperable Train Control System Management (ITCSM) system, allows for the configuration and management of systems assets across the operating territories of different railroads. IPTC messaging and ITCSM are and the Interoperable Train Control Messaging (ITCM) system.

Figure 2A:
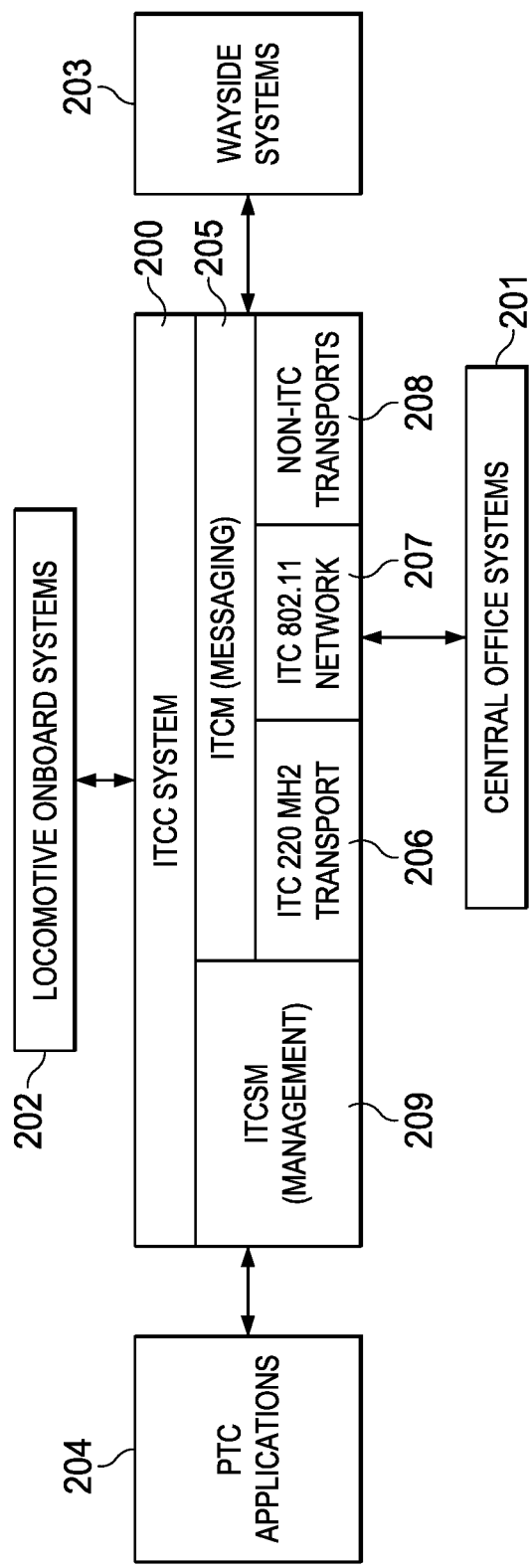
FIG. 2A is a diagram of the overall architecture of an Interoperable Train Control Communications (ITCC) system supported by the communications system of FIG. 1 and embodying the principles of the present invention.

FIG. 2A shows the overall relationships of a ITC message system based on a Interoperable Train Control Communications (ITCC) system 200, which includes ITCM system 205, and ITCSM 209. In the illustrated embodiment, ITCC system 110 is based on an embodiment of communications system 100 described in further detail in U.S. Pat. No. 8,340,056. A more detailed description of the architecture shown in FIG. 2A is also found in U.S. patent application Ser. No. 14/588,959.

Generally, ITCM system 205 provides a messaging interface to various applications, including applications running on processing systems 201 within central office 101, applications running on processing systems 202 onboard locomotives 102, PTC applications 204, and applications running on processing systems 204 within waysides 104. Advantageously, ITCM system 205 allows these applications to communicate regardless of physical location and the type of connectivity (transport) used. Among other things, ITCM system 205 selects from the available transports, such as ITC 220 MHz wireless transport 206, ITC 802.11 network 207, and non-ITC transports 209, such as cellular and satellite communications. ITCM also controls message routing and manages Class D transports.

ITCSM System 209 is generally used to securely pass status, event, and configuration data between different railroad assets using ITCM messaging system 205. For example, the ITCSM system 209 architecture provides a secure method for railroad central office applications to remotely configure and manage each ITC asset, such as a wayside device 104, to implement PTC functionality. ITCSM System 116 also supports the transfer and loading of software, security, data and configuration kits to remote assets, as well as the remote execution of commands by those assets.

Figure 2B:
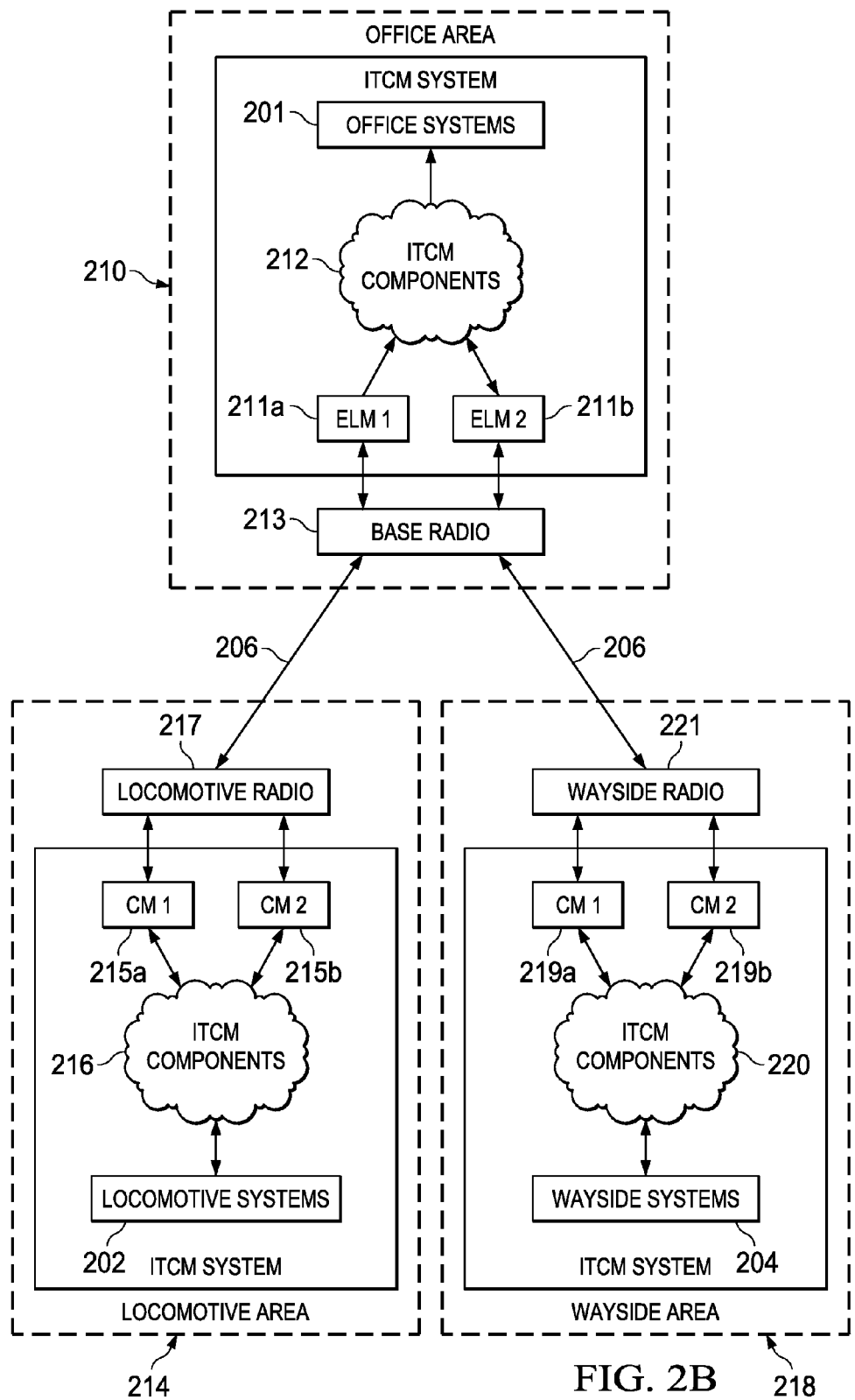
FIG. 2B is a high level diagram of the communications paths between an exemplary office area, locomotive area, and wayside area supported by the system architecture shown in FIG. 2A.
Figure 3A:
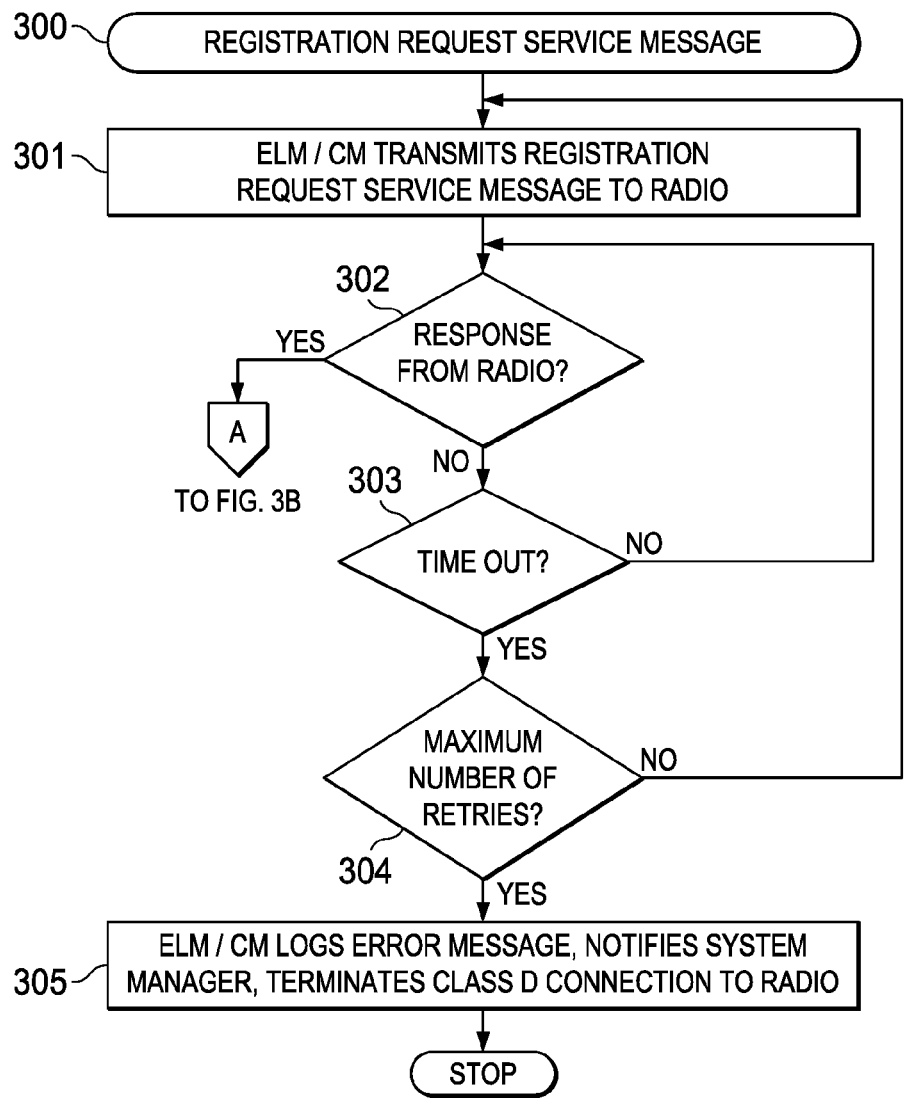
FIGS. 3A-3D are collectively a flow chart of a representative transaction in which a host requests registration with a radio using a preferred Registration Request Service Message.
Figure 3B:
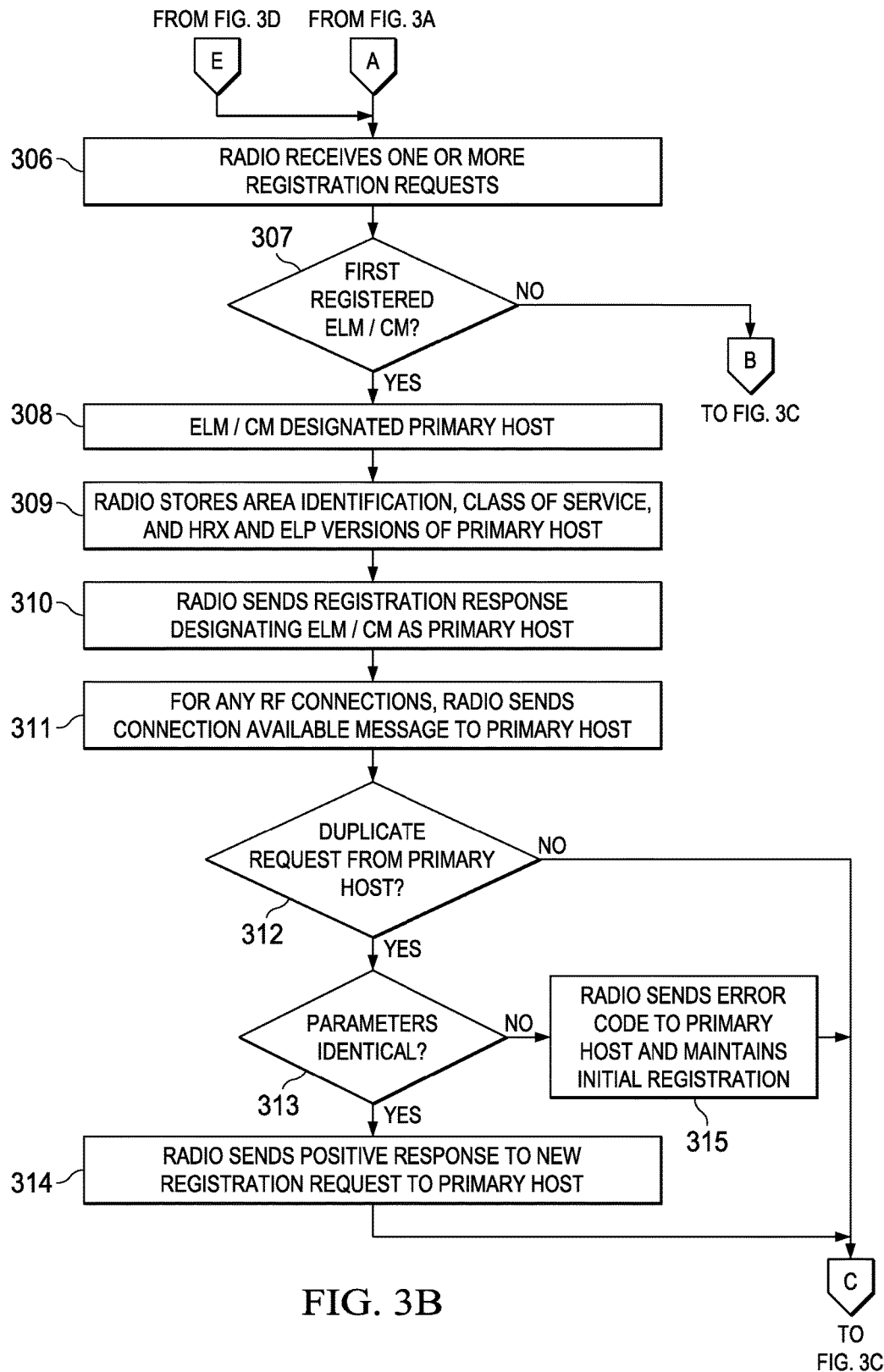
Figure 3C:
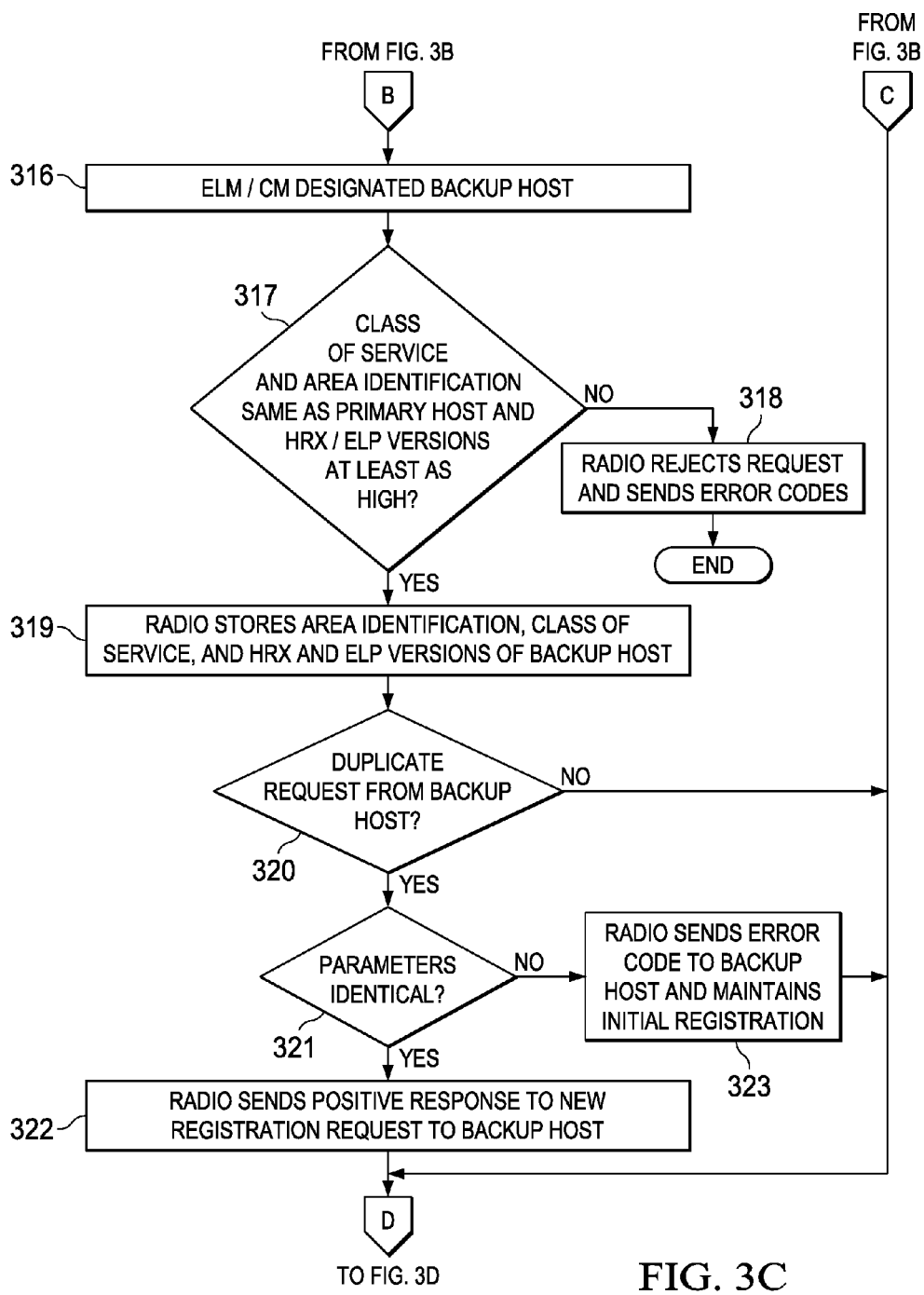
Figure 3D:
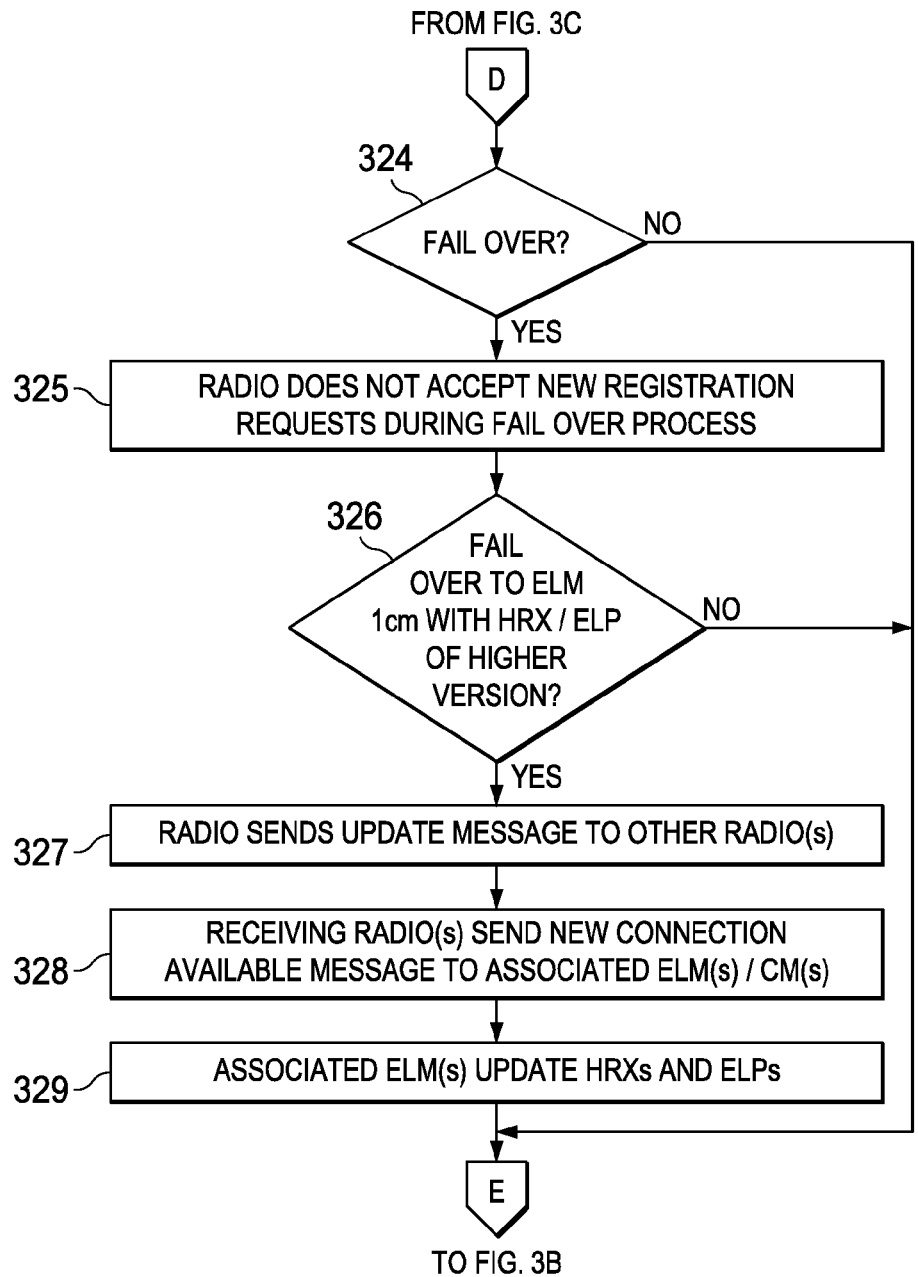

FIG. 2B illustrates the relationship between areas in ITCC system 200, in this example a representative office area, a representative locomotive area, and a representative wayside. The number and types of areas within the given ITCC system 200 will varying in actual practice.

Office area 210, which is associated with central office 101, includes a plurality external link managers (ELMs) 211a-211b) which bridge the remaining ITCM system components 212 with the various applications being run by central office systems 201. Office area 210 also include one or more base radios 213, each associated with a base station 103, along with backhauls connecting each base radio 216 with at least one ELM 211 (i.e., the wired side connection). As discussed below, each radio 213 communicates with one or more ELMs 211 using a host to radio exchange interface (HRX) embodying the principles of the present invention. Each radio 213 communicates with other radios in the system, such as radios in the locomotive and wayside areas, across a wireless side interface and the ITC 220 MHZ transport 206.

A representative locomotive area 214 is also shown in FIG. 2B. Locomotive area 214 generally encompasses ITCM systems onboard a locomotive 102, including a plurality connection managers (CMs) 215a-215b bridging the remaining onboard ITCM components 216 with the locomotive radio 217. ITCM components 216 communicate messages with applications running on locomotive processing systems 202. Locomotive radio 217 includes a wired side connection to at least one CM 215 based on the HRX interface. A external link protocol (ELF) coordinates and controls the exchange of messages between CM 215, ELM 211 within the office area, and CMs in wayside areas and other locomotive areas.

Wayside area 218, which is associated with a wayside monitoring subsystem 104, includes a plurality CMs 219a-219b bridging remaining ITCM components 220 with wayside radio 221. The local ITCM components 220 communicate with the various applications running on wayside processing systems 203. The wired side connection between wayside radio 221 and each CM 219 is based on the HRX, with message exchanges to an ELM in an office area or a CM in a locomotive area or another wayside area coordinated and controlled by the ELP.

Wireless transmission between base radio 213, locomotive radio 217, and wayside radio 221 is implemented by ITC 220 MHz transport 206 of FIG. 2A. In the illustrated embodiment, wireless side interface between radios is based on the ITCnet protocol described in U.S. Pat. No. 8,340,056.

Generally, the ITCnet protocol provides the equivalent of the first four layers in the Open System Interconnection (OSI) seven layer model. A transport layer controls the transfer of data between lower layers in the radios and higher layers outside the radios. A network layer handles source-to-destination packet delivery including routing through intermediate hosts, node connectivity, routing, congestion control, flow control, segmentation, and packet sequencing between nodes. A link layer generally controls the transfer of data between nodes in the same communication link and supports error-correction schemes for addressing errors that may occur in the physical layer. Finally, a physical layer defines the means of sending raw bits over a physical wireless channel from one radio to another radio, including the properties of the modulation scheme, bit rate, bandwidth, frequency, synchronization, and multi-channel processing.

In ITCNET system, multiple access schemes are used by the base and remote radios to share available channel resources. These access schemes include fixed time division multiple access (FTDMA), dynamic time division multiple access (DTDMA), and carrier sense multiple access (CSMA) schemes.

In the FTDMA scheme, a frequency channel is time slotted. The FTDMA slot size can be different from one slot to another, but the allocation of the channel time to each user is fixed. FTDMA communications are used to support constant periodic traffic from the users. More particularly, a fixed number of FTDMA slots, each having a fixed slot size, are periodically reserved for a user at a fixed repetition rate. One FTDMA slot is used to support one FTDMA packet. Each user can be assigned multiple FTDMA slots to transmit multiple FTDMA packets.

The FTDMA configuration comprises two parts, FTDMA channel configuration and FTDMA slot configuration. Specifically, the FTDMA channel configuration specifies the channel number on which a radio will transmit FTDMA packets. The FTDMA channel number is a configurable parameter that is set in a given radio either at initial radio setup and/or during updates.

The FTDMA slot configuration specifies the start and the length of FTDMA slot for each message to be sent in an FTDMA slot. Additionally, any message to be sent in an FTDMA slot carries information that can be used to identify the FTDMA slot for that message.

In the 220 MHz IPTC system, a message with the source address is generated and sent from the application to the ELM or CM. For the message to be transmitted in the FTDMA cycle, the ELM or CM generates a slot key from the source address in the message, and then sends the slot key together with the message to the radio. The radio has a table lookup that maps the slot key to the FTDMA slot configuration for that particular message.

A radio transmits the message in the FTDMA slot that is specified in the FTDMA slot configuration. Specifically, to transmit a packet in an FTDMA slot, a radio, which includes a global positioning system (GPS) receiver, takes the slot timing from the 1PPS timing output of the GPS receiver. A radio without a GPS receiver derives the FTDMA slot timing from base station signal.

Each ELM or CM preferably runs on the same hardware platform as the rest of the local ITCM operating in an area. For example, in central office area 210, each ELM 211 will run on an office server, and in locomotive area 214 and wayside area 218, the CMs 215 and 219 will run on a processor within equipment local to the locomotive or wayside. In railroad communications system 100, all primary communications to and from a given radio are made through an ELM or CM.

In accordance with the preferred embodiment of the HRX protocol, the transport mechanism of the interface is based on the AAR S-9356 Class D Messaging specification, with some modifications. For a given wired connection (e.g. between ELM 211 and base station radio 213 of office area 210), the radio acts as the server and the ELM or CM, or other entity interfacing with the radio, is a client.

The radio and each corresponding ELM or CM operating as a host are configured with an HRX port number, which can have any value above 1024 in the illustrated embodiment. A radio may listen on and accept connections over multiple ports. In addition, a radio will support multiple host connections through a single port, which is a modification from the Class D messaging specification, which currently allows only one connection per port. When multiple connections are made through a single port, those hosts are treated as a single pool of hosts, with only one host being designated as the primary host and all others treated as secondary hosts.

The high availability (HA) layer of the Class D standard does not support an HA mechanism that is needed for supporting communications between a radio and a host in ITCC system 200. Therefore, the HA functionality is implemented at the HRX protocol level, rather than the transport (Class D) level.

High availability behavior described here applies to all radios within ITCC system 200, but is particularly suited for the wireside connection between a base radio and host within a base station 103 (e.g., the wired connection between ELM 211 and base radio 213 of FIG. 2A). High-availability relates to the behavior of a host or ELM or CM, rather than a radio. Preferably, each base station, and each remote node wirelessly communicating with a base station (e.g. locomotive area 214 or wayside area 218), is associated with only a single radio (i.e., no redundant radios).

In the preferred embodiment, when multiple ELMs and/or CMs connect to a radio via the same Class D port number, that radio designates the first ELM or CM to connects as primary host, and designates all other ELMS or CMs as secondary/backup hosts. All data and services messages through the radio are communicated through the primary ELM only, and no data are communicated through any of the secondary/backup ELMs.

If the primary host de-registers or crashes, or if its link to the radio is severed, the radio fails over to one of the secondary hosts, if one is available. The radio then sends a connection available message to the newly designated primary host for every wireless connection made to the radio. As a result, from that point on, ITCM system 205 routes all messages to other radios communicating with that radio through the new primary host. If the initial primary host returns to service, it becomes a secondary/backup host.

In the preferred embodiment, messages that are exchanged between the radio and its host (ELM or CM) are either data or service messages. The high-level structure of an exemplary HRX message, which wrapped in a Class D message, is shown in Table 1 in the Appendix. The first field in the HRX message includes an indicator of the type of the HRX message, with "S" for a service message and "D" for a data message. (If either the host or radio receives a message that does not have a type identifier of "S" or "D", the event is logged and the message is ignored).

Service messages are exchanged only between, and processed by, the radio and its host and are not intended for transmission to other nodes within ITCC system 200, although some service messages may trigger the generation of other service type messages to be sent from the radio to another radio or from a host to the ITCM system 205.

The preferred general structure of the service messages is shown in Table 2. Some of these messages are initiated by the radio and some by the host. Preferably, all integer fields are big endian and all timestamp fields are POSIX times. If the host or the radio receives a service message with an unknown service type identifier, the event is logged and reported, and the message is ignored.

A Registration Request Service Message is sent from a host to the radio and is triggered by the completion of a Class D connection to the radio. The specific structure of the preferred Registration Request Service Message is shown in Table 3. The values that go into the "HRX Protocol Version" field for different versions of HRX protocol shown in Table 4.

An HRX interface embodying the present principles is a stateful protocol. An ELM or CM must first request registration with the corresponding radio and then receive a positive registration response message before being able to operate as a host. If a radio receives data messages from an ELM or CM that has not registered with that radio or has registered, but it is not the primary host, the radio notifies the system management and returns a NACK service message back to the transmitting host with a reason code of (6) (not a primary host). Likewise, if an ELM or CM receives a data message or a service message from a radio before it has registered with that radio, the receiving ELM or CM reports the event to system management and ignores the message.

A representative registration transaction 300 between an ELM or CM and the associated radio using the Registration Request Service Message is shown in FIGS. 3A-3D. For discussion purposes, ELMs 211*a* and 211*b* and base radio 213 will be used as an example, although similar transactions will occur between CMs 215 and locomotive radio 217 and CMs 219 and wayside radio 211. At Block 301, ELM 211*a* sends the registration request to radio 213. ELM 211 takes no further action until it receives a response back from radio 213.

If a response is not received within a preconfigured time interval (Block 303) and the maximum number of retries has not been expended (Block 304), then ELM 211*a* retries the registration request. ELM 211*a* will continue to retry the registration request up to a configurable maximum number of retries. If the maximum number of retries is expended without a response from radio 213, then ELM 211*a* logs an error message, notifies system management, and/or terminates the Class D connection to radio 213 (Block 305), and exits.

Under some circumstances, it is possible for ELM 211*a* to receive a response from radio 213 to the first attempt after making a second attempt. In that case, the ELM 211a could potentially receive multiple registration responses. As long as the responses are positive responses (i.e., not error messages), ELM 211a preferably ignores the subsequent responses. If an error code is returned, ELM 211a processes the message in accordance with the registration response procedure discussed below.

At Block 306, radio 213 may receive a registration request from multiple ELMs (e.g., ELM 211a and ELM 211b). At Block 307, the first ELM 211a or 211b that succeeds in registering is designated as the primary host (Block 308) and any subsequent requesting ELMs designated as backup hosts (Block 316).

In this example, ELM 211a registers first and is designated the primary host. For the primary host, radio 213 stores the area ID, class of service, ELP version, and the HRX version used by the primary host internally (Block 309). Radio 213 then sends a registration response message to ELM 211a designating it the primary host such that radio 213 can now accept RF connection requests to other radios 200 (Block 310). (In the case of base station radio 213, the base station 103 can now accept wireless connections from remote radios such as locomotive radio 217 and wayside radio 221). In addition, if radio 213 determines that it has an RF connection to another radio, it can send Connection Available message to ELM 211 as the primary host.

If, at Block 312, radio 213 receives a duplicate registration request from ELM 211a (the designated primary host), radio 213 compares the parameters in the new registration request message (i.e., Class of Service, area ID, ELP version, and HRX version) with those received during the initial registration of ELM 211a as the primary host (Block 313). If the two sets agree, then radio 213 returns a positive registration response message to ELM 211a as primary host (Block 314). If the two sets differ in any form, then radio 213 returns a negative response with error code 8 to the primary host and keeps the initial registration intact (Block 315).

For any request received from an ELM or CM designated as a backup host at Block 316 (e.g. ELM 211b), the Class of Service and the Area ID that are passed to radio 213 must be identical to those passed by the primary host (e.g. ELM 211a) (Block 317). If not, radio 213 rejects, at Block 318, the registration request of the backup host and returns an appropriate error code (codes 2 or 3), as discussed below with regards to the Registration Response Message.

The HRX version and the ELP version passed by a backup host (e.g. ELM 211b) may be different from those of the primary host (e.g. ELM 211a), which is allowed by radio 213; however, the versions must be equal to or higher than the versions used by the primary. In other words, any ELM or CM acting as a backup host cannot be operating from an HRX and/or ELP version that is lower from those of the primary host. If either one is lower than the version used by the primary host, the associated radio returns an appropriate error response (codes 6 or 7) (Blocks 317 and 318).

If the parameter check at Block 317 is successful, radio 213 stores the area ID, class of service, ELP version and the HRX version used by the ELM or CM acting as the backup host internally, at Block 319.

If radio 213 receives a duplicate registration request from a designated backup host, such as ELM 211b in this example, (Block 321), it compares the set of parameters in the new registration request message (i.e., Class of Service, area ID, ELP version, and HRX version) with the set of parameters currently in use for that backup host from the initial registration (Block 321). If the two sets agree, then the radio returns a positive registration response to the backup host (Block 322). Otherwise, if the two sets differ in any form, radio 213 returns a negative response with error code 8 to that backup host and keeps the initial registration intact (Block 323).

If radio 213 is in the process of failover (e.g., ELM 211a is inoperative as the primary host), at Block 324, it will not accept any new registration requests, returning an error code 9 to any ELM attempting to register while in the failover process (Block 325).

When radio 213 fails over to a backup host (e.g. ELM 211b) whose HRX and/or ELP version is higher than the initial primary host (Block 326), radio 213 sends a message to any other radios in wireless communication to update the protocol versions of their associated HRX connections (Block 327). In particular, the update request causes any receiving radio to send a new Connection Available Message with the new HRX and/or ELP versions to its own host (Block 328), which then update the communications link (Block 329).

For example, consider the case of a base station radio B that has a primary host (H) running on HRX 2 and ELP 2 and backup host (H') running on HRX 2 and ELP 2. Also, consider a remote radio R with host on HRX 2 and ELP1. When radio B fails over to H', radio B sends a message to the remote radio R to update protocol versions. The remote radio sends a new Connection Available Message to its host with the new version information (i.e., HRX 2 and ELP2), which allows that host to update the connection (i.e., to HRX 2 and ELP2).

As previously indicated, it is possible for multiple backup hosts to register with the same radio. Some backup hosts may have HRX/ELP versions that are higher than that of the primary host, and some may have HRX/ELP versions that are the same version as the primary host. For example, consider the case of a primary (H) and two backup hosts (H' and H") with the following information: H: HRX 3, ELP 2; H': HRX 3, ELP 3; and H": HRX 3, ELP2.

Assume that radio B fails over to H', which has a higher ELP version than first primary host H (i.e., ELP version 2 for the first primary host H versus ELP version 3 for the second primary host H"). Now assume that second primary host H' fails over to third primary host H", which has a lower ELP version (i.e., ELP version 2). In other words, radio B has failed over to a backup host having a lower version of HRX/ELP than the primary.

To avoid this situation, a radio given must check the ELP and HRX version of all backup hosts with respect to that of the first backup host, such that all backup hosts are operating on the same version of the HRX and ELP. Any backup host requesting registration after registration of the first backup host must have an HRX and/or ELP version at least as high as the first backup host, otherwise that registration request must be denied and the error code 10 returned in the Registration Response Service Message.

A radio also compares the HRX Protocol Version against its own version. If the primary host version is lower than the version that is implemented in the radio itself or if the primary host version is off by more than two versions, it responds with a registration failure response (error code 1).

The preferred structure of the Registration Response Service Message is shown in Table 5 of the Appendix. Registration Response Service Messages are sent from the given radio to the requesting ELM or CM (host) in response to the receipt of a registration request, as discussed above. The present example of ELMs 211a and 211b and base radio 213 continues for discussion purposes.

In particular, the radio 213 sends the Registration Response Service Message in response to Registration Request Service Message received from ELM 211a attempting to register as a host. The Registration Results field of the Registration Response Service Message includes error codes indicating various errors or failures identified by the radio.

In the illustrated embodiment of the HRX interface, Code 1 flags a Version Mismatch Error, which indicates that the version of the HRX protocol that is supported by radio 213 is higher than that of the requesting ELM 211 or that the version of the HRX being run by radio 213 is more than two versions behind that of requesting ELM 211a.

Code 2 flags an invalid Class of Service error, which indicates that the class of service in a request message received from an ELM designated as a backup host differs from the class of service set for the ELM or CM designated as the primary host. Code 3 flags an Invalid Area ID and is returned to an ELM designated as a backup host if the registration request message included an area ID that is different from the one supplied by the ELM or CM designated as the primary host.

Code 4 flags a Radio Hardware Failure. Code 5 flags a Malformed Registration Request, meaning that the Registration Service Message received by the radio was somehow malformed. Code 6 indicates that the registration request received from an ELM or CM designated as a backup host is running a version of the HRX that is less than the corresponding version used by the ELM 204 designated as the primary host. Code 7 indicates that the registration request received from an ELM or CM designated as a backup host is running a version of the ELP that is less than the corresponding version used by the ELM or CM designated as the primary host.

Code 8 flags a Duplicate Registration Request, and is returned to an ELM or CM, designated as either a primary or backup host, when the radio 204 receives a registration request from that ELM with a set of parameters whose values differ from the set of parameters that was provided in the initial registration request. Code 9 flags the "I am in the failover process", indicating to any ELM or CM attempting to register as a host that the radio is in the process of failing over to a new backup host.

Code 10 indicates to an ELM 204 designated as a new backup host that the ELP and/or HRX version of the new backup host differs from that of at least one previously registered backup host.

Figure 4A:
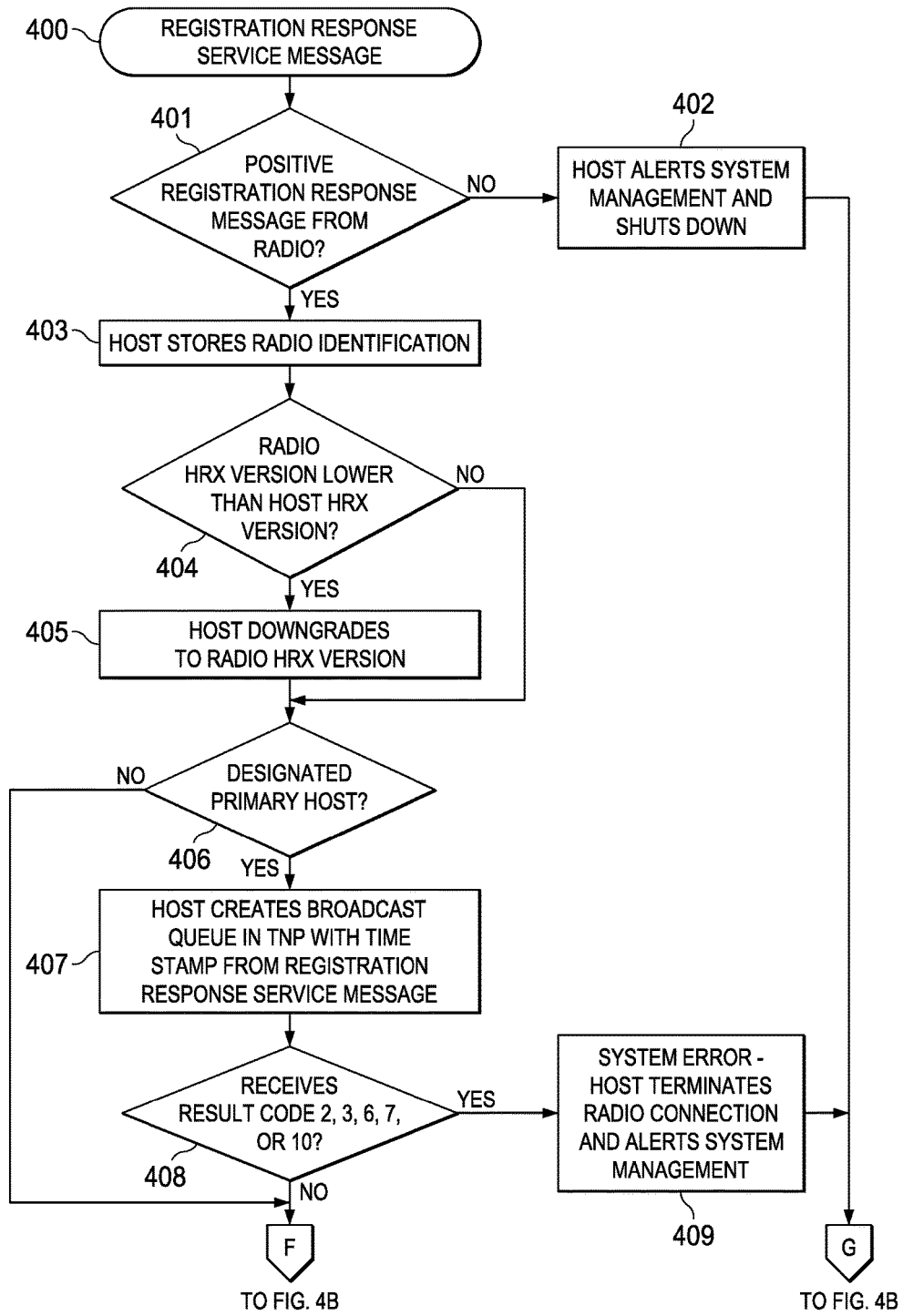
FIGS. 4A-4C are collectively a flow chart of a representative transaction in which a radio returns a preferred Registration Response Service Message to a host requesting registration with the radio.
Figure 4B:
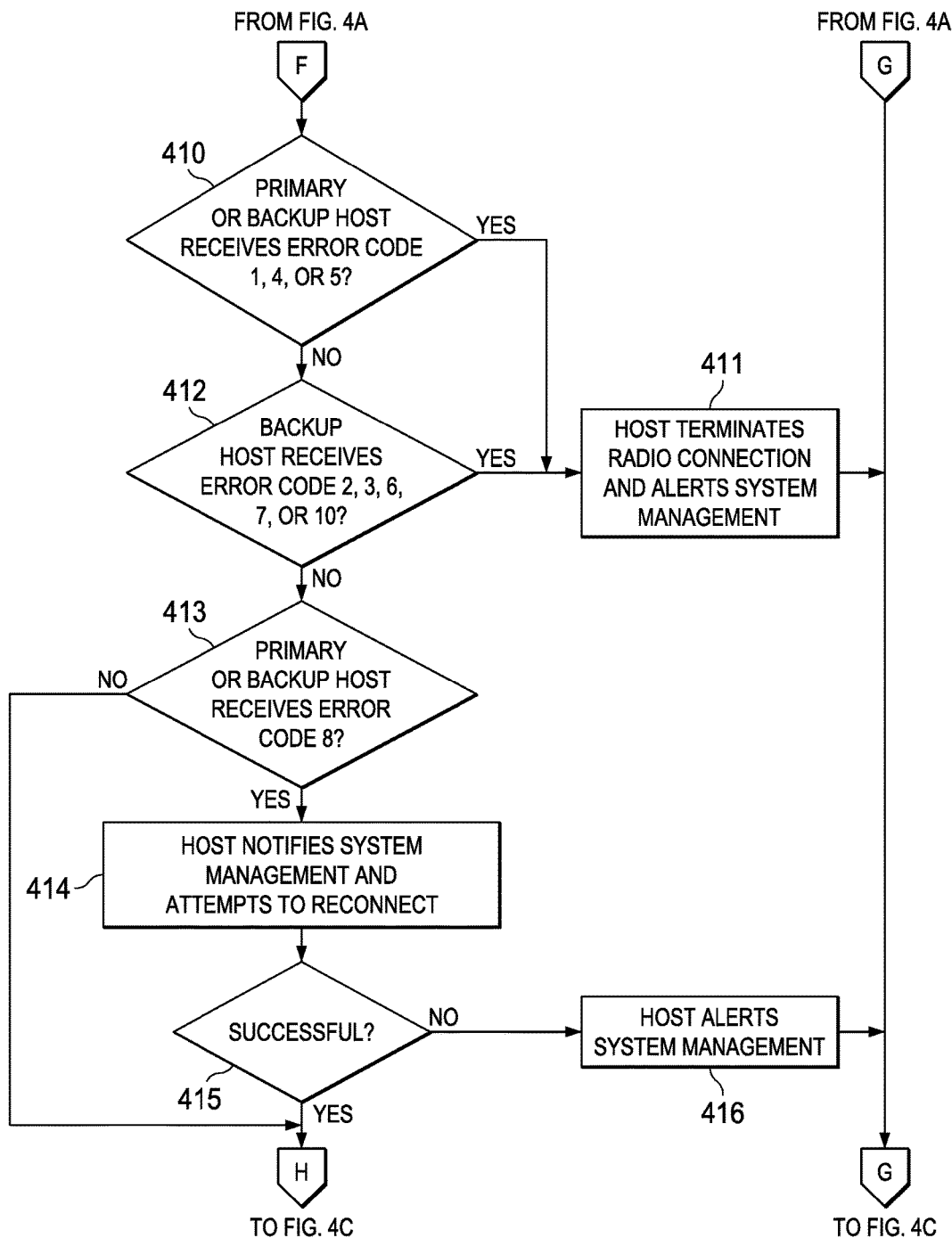
Figure 4C:
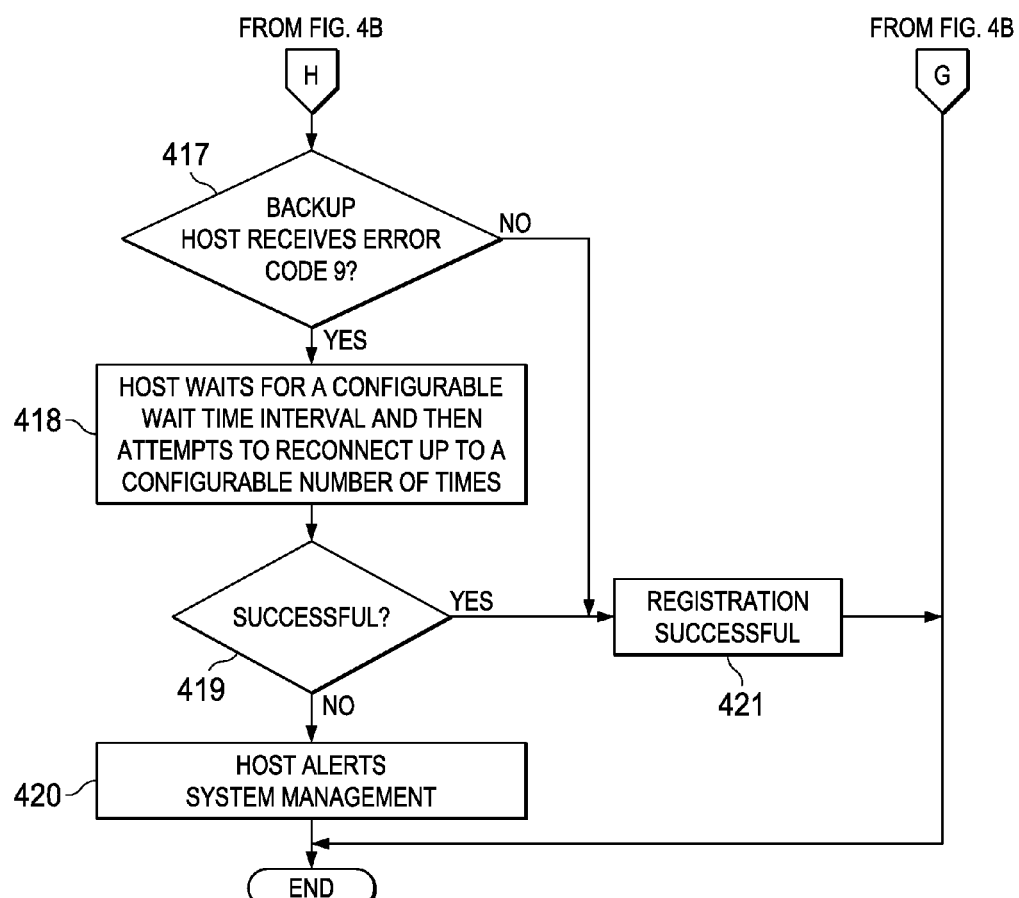

FIGS. 4A-4C illustrates a preferred registration response transaction 400 using the Registration Response Service Message. If the host (e.g., ELM 211a or 211b) does not received a positive registration response from the radio at Block 401, the host alerts system management and shuts down (Block 402). Otherwise, at Block 403, the host breaks out of the radio registration loop and stores the radio ID.

A comparison is then made at Block 404 between the HRX versions being run by the radio and by the host. If the version that is supported by radio 200 is lower than the version supported by the host (but still within the past two versions), the host downgrades at Block 405 and operates on the lower version.

If the ELM or CM is designated as the primary host at Block 406 (in this example ELM 211a), then ELM 211a creates the base broadcast queue at Block 407, using the time stamp received from radio 213 in the Registration Response Service Message. (Backup hosts do not create a broadcast queue.)

If the ELM or CM is designated the primary host (e.g., ELM 211a), the Registration Response Service message it receives should not include (in the Results fields) any of error codes of 2 (invalid class of service), 3 (invalid area ID), 6 (backup host has lower HRX version than primary host), 7 (backup host has lower ELP version than primary host), 10 (backup host HRX and/or ELP versions differ from those of other backup hosts) (Block 408). If it does, these are system errors and the designated host (ELM 211a) terminates its connection to radio 213 and alerts system management (Block 409).

If at Block 410, a host (primary or backup, which in this example is either ELM 211a or ELM 211b) receives error code 1 (version mismatch), 4 (radio hardware failure), or 5 (malformed registration request), that host logs the error, terminates the radio link and notifies system management at Block 411, but does not try to reconnect to the radio again without a restart or instruction from system management.

Similarly, at Block 412, a host designated as a backup (e.g., ELM 211b) will execute the same procedure if it receives any of error codes of 2 (invalid class of service), 3 (invalid area ID), 6 (backup host has lower HRX version than primary host), 7 (backup host has lower ELP version than primary host), or 10 (backup host HRX and/or ELP versions differ from those of other backup hosts). (Receipt of error codes 2 or 3 indicates that the backup host is using configuration values for the class of service and/or the area ID that are different from those used by the primary host.)

If a host (either the primary, such as ELM 211a, or a backup, such as ELM 211b) receives error code 8 (duplicate registration request with differing registration sets) at Block 413, the host notifies system management and attempts to reconnect at Block 414. If the reconnection attempt fails at Block 415, then the host alerts system management and does not attempt another reconnection without a restart or instructions from system management (Block 416).

If at Block 417 an ELM or CM designated as a backup host, such as ELM 211b in this example, receives error code 9 (radio in fail over process), that ELM or CM waits for a configurable period of time and then attempts to register again, up to a configurable number of retry times (Block 418). If the configurable number of retry times is expended without a successful reconnection at Block 419, then, at Block 420, the backup host alerts system management and makes no further reconnection attempts.

If the Registration Response Service Message only includes Code 0 in the Results field, then registration of the given ELM as either a primary host or backup host is successfully completed at Block 421.

It is possible that the ELM or CM requesting registration as a host may receive a response to a first registration attempt after making second registration attempt, which could result in that ELM or CM receiving multiple Registration Response Service Messages. As long as the responses are positive (i.e., do not contain an error code), the requesting ELM or CM can ignore the subsequent response messages, although if an error code is returned, the error code must be addressed as just described.

The preferred structure for the De-register Service Message is shown in Table 6. This message is sent from an ELM or CM designated as either a primary or backup host requesting that its connection with the associated radio be terminated. (In addition, the requesting host may also request termination of the Class D transport connection.) Once a host has de-registered, the radio no longer sends acknowledgement (ACK) or no acknowledgment (NACK) messages to any outstanding messages from that host that are in radio transmit buffer.

Figure 5:
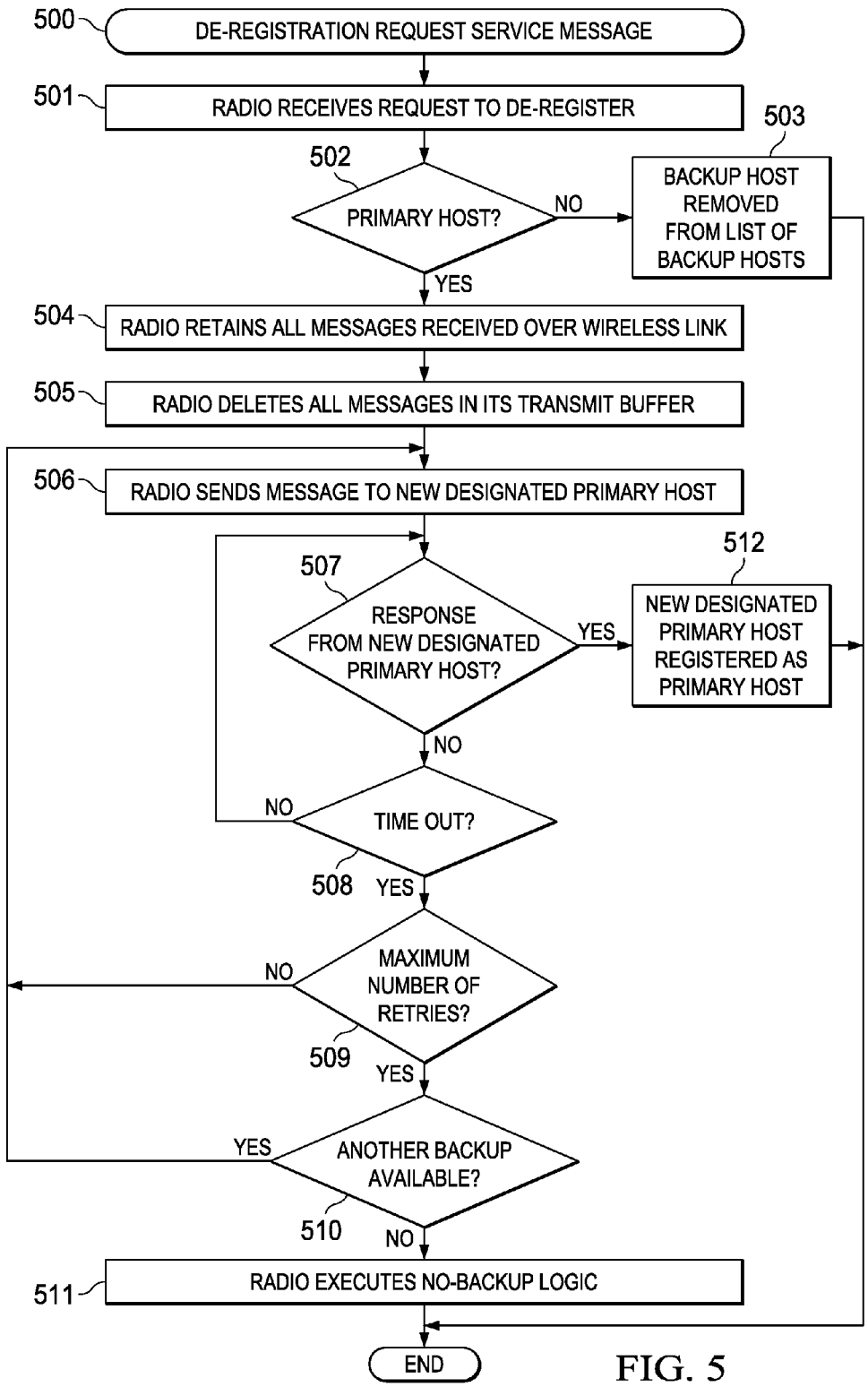
FIG. 5 is a flow chart of a representative transaction in which a host requests de-registration from a radio using a preferred De-register Service Message.

A preferred de-registration procedure 500 is shown in FIG. 5, which begins with the radio receiving a De-register Service Message at Block 501. ELMs 211a and 211b and radio 213 will again be used as an example. If, at Block 502, the requesting ELM or CM is a backup host (e.g., ELM 211b), then the radio (e.g., radio 213) removes that ELM or CM from the list of backup hosts at Block 503.

On the other hand, assuming that the radio has primary host (e.g., ELM 211a) and at least one backup host connected to it (e.g., ELM 211b), then the radio (e.g., radio 213) keeps all of the messages received over its wireless connections in its queue at Block 504 such that an attempt can be made to send those messages after the failover connection becomes active. The radio also deletes all messages that it has in its transmit buffer (Block 505).

At Block 506, the radio transmits a Failover Message to an ELM or CM currently acting as a backup host (e.g., ELM 211b) that it has been designated the new primary host.

The radios expect that the ELM or CM to respond back with the Failover Confirmation Message before continuing or resending the Failover Message at Block 507. If no response is received after a configurable timeout interval (Block 508), the radio resends the Failover Message to same ELM or CM (backup host) up to a configurable number of times (Block 509).

If the maximum number of retries are expended and another backup host is available (Block 510), the radio sends the Failover Message to another backup host and repeats the failover confirmation process. If no backup host is available or no backup host timely responds to the Failover Message with a Failover Confirmation Message, then the radio applies the no-backup logic at Block 511.

If and when an ELM or CM acting as a backup host, such as ELM 211b, successfully responds with a Failover Confirmation Message, that ELM or CM is registered as the primary host at Block 512. If the radio has an ITCnet connection to another radio (e.g. locomotive radio 217 or wayside radio 221 in the case of base radio 213), it notifies the other radio that it has terminated a host connection.

A radio, such as base radio 213, also implements Procedure 500 if instead of receiving a request to de-register at Block 501, the Class D connection to a host is broken, either because the link is severed or because the host unexpectedly terminated.

The preferred structure for the Connection Available Service Message is shown in Table 7. Generally, this message, which is sent from a radio (e.g., base radio 213) to an ELM or CM acting as a primary host (e.g., ELM 211a), indicates that a connection to another radio (e.g., locomotive radio 217 or wayside radio 221) has been established and that other radio is connected to its host.

Figure 6A:
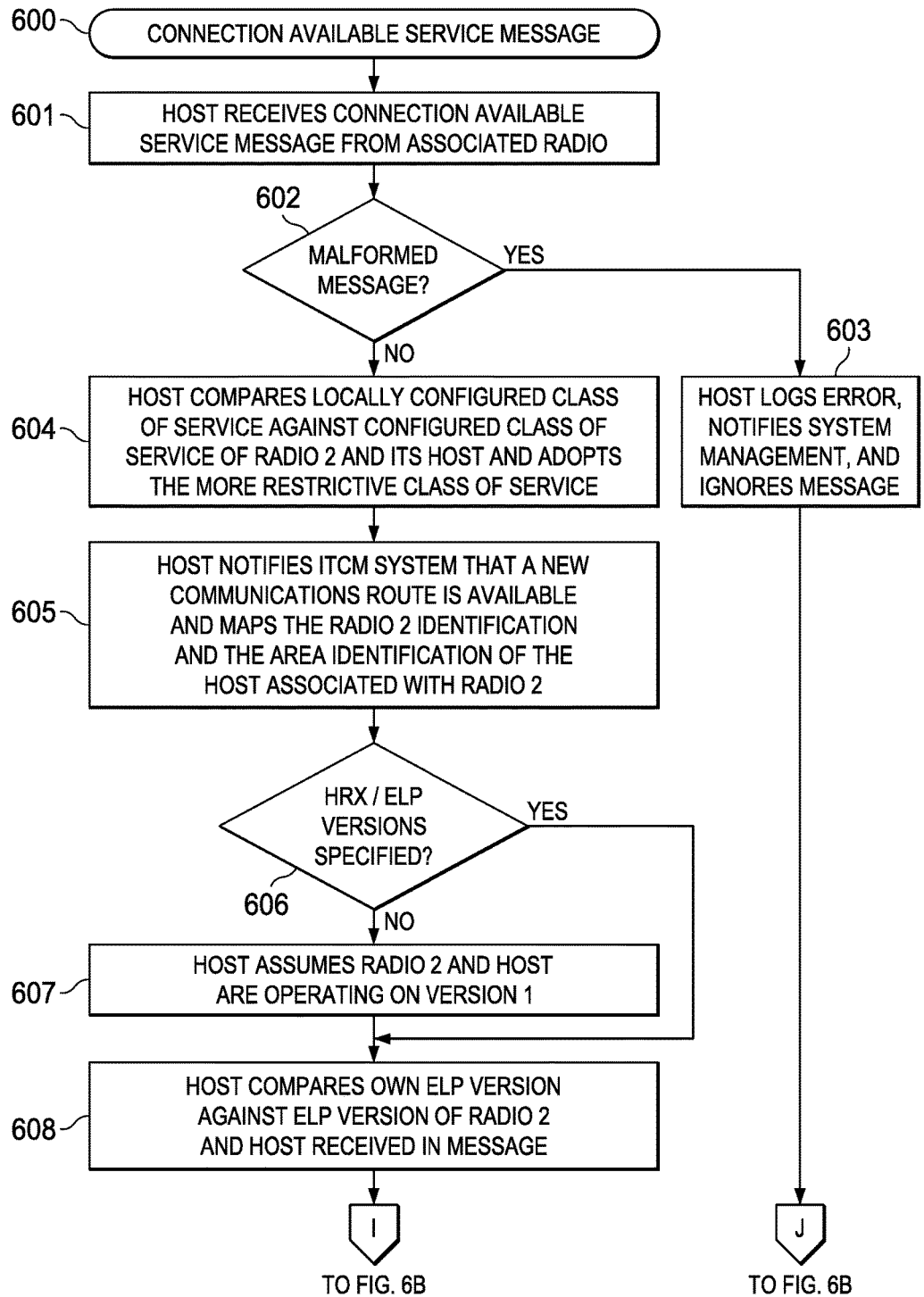
FIGS. 6A-6B are collectively a flow chart of a representative transaction in which a host processes a preferred Connection Available Service Message received from a radio.
Figure 6B:
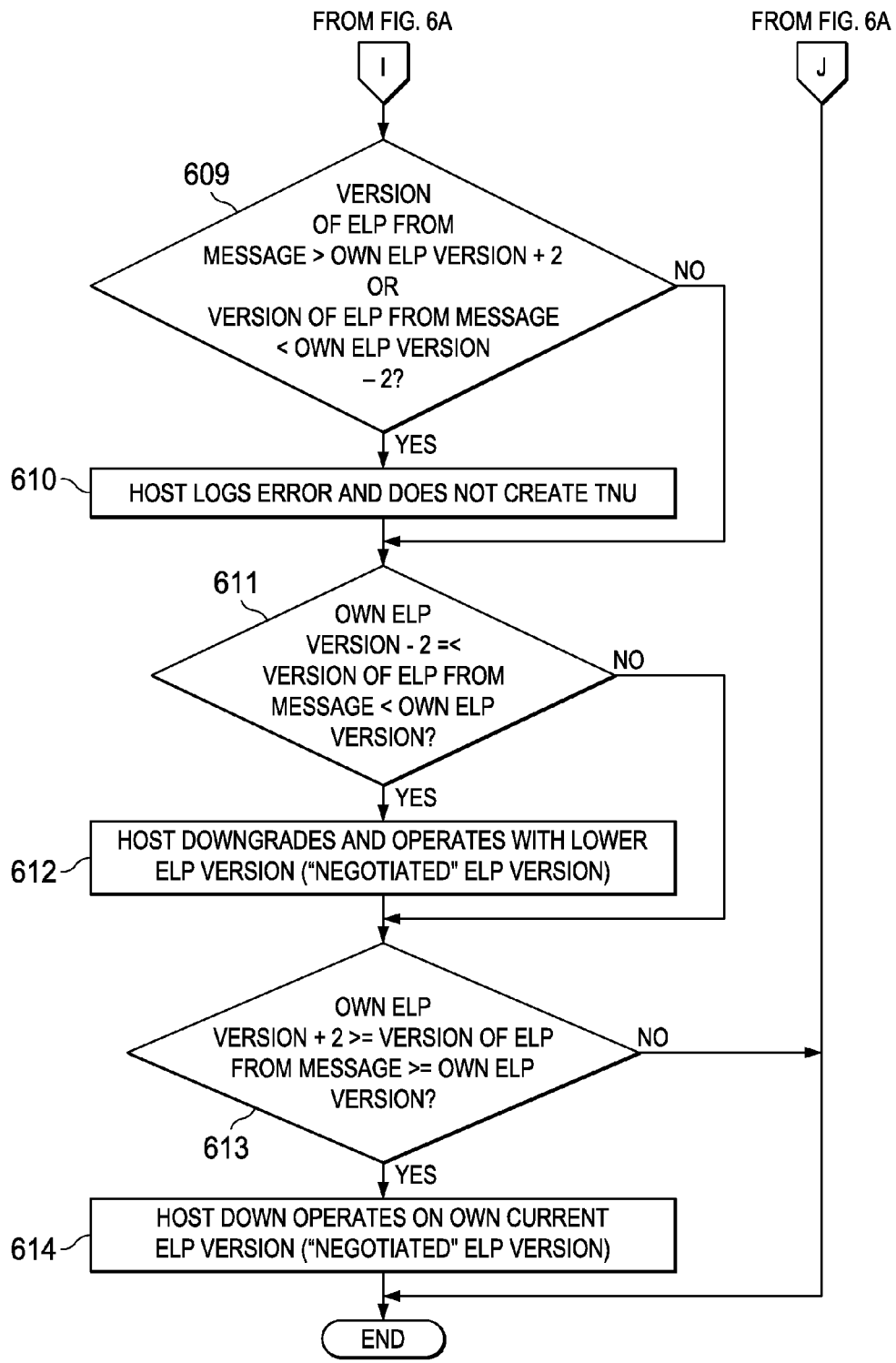

An exemplary Procedure 600 using the Connection Available Service Message is shown in FIGS. 6A-6B, using ELM 211a and radio 213 and CM 219 (as primary host) and wayside radio 221 as an example. At Block 601, ELM 211a as primary host receives a Connection Available Service Message from radio 213. If the message is malformed, at Block 602, the primary host logs the error, notifies system management, and ignores the message (Block 603).

Otherwise, at Block 604, the primary host (ELM 211a) compares the local configured class of service with that of wayside radio 221 and its primary host (CM 219a), as determined from the Class of Service field of the received Connection Available Service Message, and adopts the most restrictive class of service (Block 604). At Block 605, the primary host (ELM 211a) notifies the ITCM system that a new route is available and maps the ID for wayside radio 221 and the area ID of wayside area 218.

At Block 606, the host determines if the ELF) and HRX versions are specified in the message or not. More specifically, for the case when two connecting radios are on two different versions of the HRX interface, the radio that is supporting the higher version of HRX interface may not receive the necessary data (i.e., ELP and/or HRX version data) from the radio that is running the older version of the software. In that case, the radio generating the Connection Available Service Message (e.g., radio 213) puts the "unknown" value (e.g., a "0") in one or both of these message fields. If the primary host finds a 0 in either or both of these fields, it operates on the basis that the other radio and host (e.g., wayside radio 221 and CM 219a) are running version 1 of the HRX and/or ELP (Block 607).

The host (ELM 211a) next compares its own version of ELP with the ELP version that is passed on in the Connection Available message, at Block 608. If at Block 609, the ELP version from the message is greater than the version being run by the host (ELM 211a) plus 2 or the ELP version from the message is less than the version being run by the host (ELM 211a) minus 2, then the host logs an error and does not create a TNU (transport network update). In this case, the host (ELM 211a) is prevented from sending messages via the wireless link, although it may be allowed to receive messages via the wireless link (discussed further below).

On the hand, if at Block 611 the primary host's own version minus 2 is less than or equal to the ELP version being run by wayside radio 221 and its primary host (CM 219a) and the host's (ELM 211a) own version is greater than the ELP version being run by wayside radio 221 and its host (CM 219a), then the host (ELM 211a) downgrades at Block 612 and runs the ELP version being run by wayside radio 221 and CM 219a (i.e., the "Negotiated ELP Version").

Finally, at Block 613, if the ELM 211a (host) version plus 2 is greater than or equal to the ELP version being run by wayside radio 221 and CM 219a and the ELM 211a (host) version is less than or equal to the ELP version being run by wayside radio 221 and CM 219a, then the host (ELM 211a) operates on the current version of the ELP being run by the host (ELM 211a).

When a radio fails over to a backup host, the version of the HRX and/or ELP that is supported by the backup host may be higher than that of the primary. As a result, when the radio fails over, it sends a message to any other radio in wireless communication to update the protocol versions for the receiving radio and its primary host, after which the receiving radio sends a new connection available message to its host. Therefore, it is possible for a host to receive a new connection available message for an existing connection. The host therefore needs to update the protocol version info on that connection and start operating based on the new version values.

For example, consider the case of base radio 213 and ELM 211a acting as the primary host are operating on HRX 2 and ELP 1 and that ELM 211b acting as the backup host is operating on HRX 2 and ELP 2. In addition, assume that wayside radio 221 and CM 219a acting as its primary host are operating on HRX 2 and ELP 1. When base radio 213 fails over to ELM 211b, base radio 213 sends a message to wayside radio 221 to reconcile protocol versions. In this case, wayside radio 221 sends a new connection available message CM 219a as primary host with the new version info for the connection with base radio 213 and ELM 211b (i.e., HRX 2 and ELP2.)

When an ELM or CM receives a data message from a radio, that ELM or CM must compare the ELP version on the received data message with its own ELP version (not the "Negotiated ELP Version"). The ELM or CM accepts and processes any message whose ELP version is between its own ELP version and its own ELP version −2 and rejects (e.g., logs and drops) any other data messages whose ELP version do not pass this criteria.

When an ELM or CM is sending a data message, and the message is unicast, the ELM or CM uses the "Negotiated ELP Version" on the message that is being sent. If the data message is broadcast, the ELM or CM uses the version that is configured as the "Broadcast ELP Version" in the ELM configuration file.

In order to decide which data messages are to be broadcast and which are to be unicast, another configuration parameter is needed. In the preferred embodiment, the ELM/CM configuration parameter list includes SH (special handling) codes that imply broadcast. Therefore, the radio sending logic checks the SH code on the message being transmitted. If there is no SH (SH=0), then the message is unicast. Otherwise, if the SH code on the message is in the configured list, the message is broadcast. If the configuration parameter that holds this list is missing, the default parameter is used, which is that any message with an SH code is broadcast.

When a radio (e.g., base radio 213) fails over from a primary host (e.g., ELM 211a) to a backup host (e.g., ELM 211b) whose HRX and/or ELP version is different from that of the current primary host, the radio sends a message to a radio in wireless communication (e.g., wayside radio 221) to update the HRX and/or ELP version of its primary host (e.g., CM 219a). In response, the receiving radio sends a connection available message to the ELM or CM acting as its primary host. Therefore, the host at the receiving end may receive a New Connection Available Message for a connection that has already been established. In that case, the receiving host must update the "negotiated" version information and start operating under the new negotiated version.

The use of HRX versions allow for additional parameters to be added to the HRX. It tells a host about the level of knowledge that a host and its associated radio on the other side of a wireless connection have about newly added parameters.

Unless there is a fail over, a backup host should not receive a Connection Available Service Message. If backup host does receive this message, it logs the event, notifies system management, disconnects from the associated radio, and reconnect to the associated radio again.

A radio sends the Connection Available Service Message only if it has an ITCnet connection established with another radio and the other radio is also connected to its host. Furthermore, a radio sends Connection Available Service Messages only to the primary host associated with that radio.

As discussed above, when two connecting radios are running two different versions of HRX, the radio that is supporting the higher version of the HRX may not receive the necessary data (i.e., ELP and/or HRX version data) from the radio running the older version of the software. In this case, the radio sending the Connection Available Service Message inserts an "unknown" value (i.e., "0") in the HRX and ELP version fields.

In the Connection Available Service Message, the timestamp field holds the time that the radio sends the connection available message to the host. In other words, it is not the time when the RF connection between the two radios is established, because at the time that the RF connection is established, one or both radios may not be connected to their host.

The preferred structure for the Connection Unavailable Service Message is shown in Table 8. This message is sent from a radio to an ELM or CM acting as a primary host indicating that that the connection to another radio is broken, the connection between another radio and its host is broken, or if the transmitting radio loses its ITCNet connection.

The Connection Unavailable Service Message is sent to the primary host only. In the event of a malformed message, the receiving host logs and reports the error to system management, and ignores the message. Otherwise, the receiving primary host removes the map of radio ID to area ID for the radio to which the connection is broken. The host uses the Connection Unavailable Service Message timestamp in its TNU message.

A backup host should not receive the Connection Unavailable Service Message Connection Unavailable Service Message; however, if a backup host does receive this message, it logs the event, notifies system management, disconnects from the radio, and reconnects again.

Table 9 shows the preferred structure for the Message Transmission Ack Service Message, which is sent from a radio to the associated primary host indicating that a message has been successfully transmitted.

On receipt, the primary host removes the Message Transmission Ack Service Message from its queue. (In the event of a malformed message, the receiving host logs and reports the error and ignores the message.)

If the message that is being transmitted is a unicast message going to a receiving radio that has an ITCnet connection with the transmitting radio, the Message Transmission Ack Service Message means that the receiving radio has received the message. If the message that is being transmitted is a broadcast message, the Message Transmission Ack Service Message means that the transmitting radio has transmitted the message.

For short broadcast messages, the transmitting radio must acknowledge all messages, not just the one that it transmits. Therefore, the transmit radio sends the Message Transmission Ack Service Message immediately when it receives them from the host. The only exception is when the radio will be unable to transmit these messages, such as the case of losing a GPS lock.

The radio will not send ACK or NACK messages back to the associated primary host if the primary host has broken its connection to the radio or if radio has sent a connection unavailable message to the primary host. In this case, the primary host operates as if all pending messages (messages that have been handed over to the radio but an ACK or NACK has not been returned) would receive a NACK.

Table 10 shows the preferred structure of the Message Transmission Nack Service Message, which is sent from a radio to an ELM or CM operating as a primary host indicating that the radio was unable to transmit a message. (A backup host should not receive this message; however, if a backup host does receive a Message Transmission Nack Service Message, that backup host logs the event, notifies system management, disconnects from the radio, and reconnects again.)

Code 1 (buffer overflow) is returned when the radio 200 has to drop a message out of its unicast or long broadcast buffer when the buffer is full. When a radio receives a message from the primary host when its transmit buffer is full, it must compare the priority of the new message to the priority of messages in the transmit queue. If the radio finds a buffered message with lower priority, it must drop that message and return a NACK code 1 for that message. If the priority of the new message is lower than all messages in the buffer, the radio drops the new message and returns a NACK code of 1.

Code 3 (RF connection unstable) is returned when the radio is attempting to send a unicast message, but, because of a poor RF connection, the receiving radio is not acknowledging the receipt of the message. (Eventually, either the RF connection becomes stable or the two radios disconnect.)

Code 4 is returned by the radio when the message TTL (time to live) expired before the radio was able to transmit the entire message. Code 5 (missing radio ID/inconsistent header data) is transmitted when the message received from the primary host for transmission contains a formatting error or wrong information in the header. Code 6 (not primary host) is returned when the radio receives a data message to send over the air from a backup host.

The radio returns Code 7 when an internal radio hardware failure is preventing the transmission of the message. Code 8 (slot not wide enough is returned when the radio is not able to transmit a short broadcast message because either the radio does not have an entry for a slot for the given slot key or the message is too large and does not fit into the slot allocated for that message. Code 9 (unicast message is too long) is returned by the radio when the host has given the radio a unicast data message to transmit that is larger than the maximum size of a message the radio can handle. The radio transmits Code 10 (broadcast message is too long) when the host has given the radio a broadcast data message to transmit that is larger than 255 bytes.

Code 11 (message is not transmittable) indicates that, for some reason, the radio is not able to transmit a particular unicast message. Code 11 is used, for example, in situations where sending radio is operating properly, but the sending radio does not receive an acknowledgement back from the receiving radio, even after retries. Code 12 (no connection to intended receiving radio) is preferably only returned by the radio when the transmitting radio does not have a connection to the intended receiving radio of a unicast message. Code 13 (cannot transmit short broadcast) is transmitted by the radio when the GPS lock is lost and as a result, the radio cannot transmit FTDMA messages.

Figure 7A:
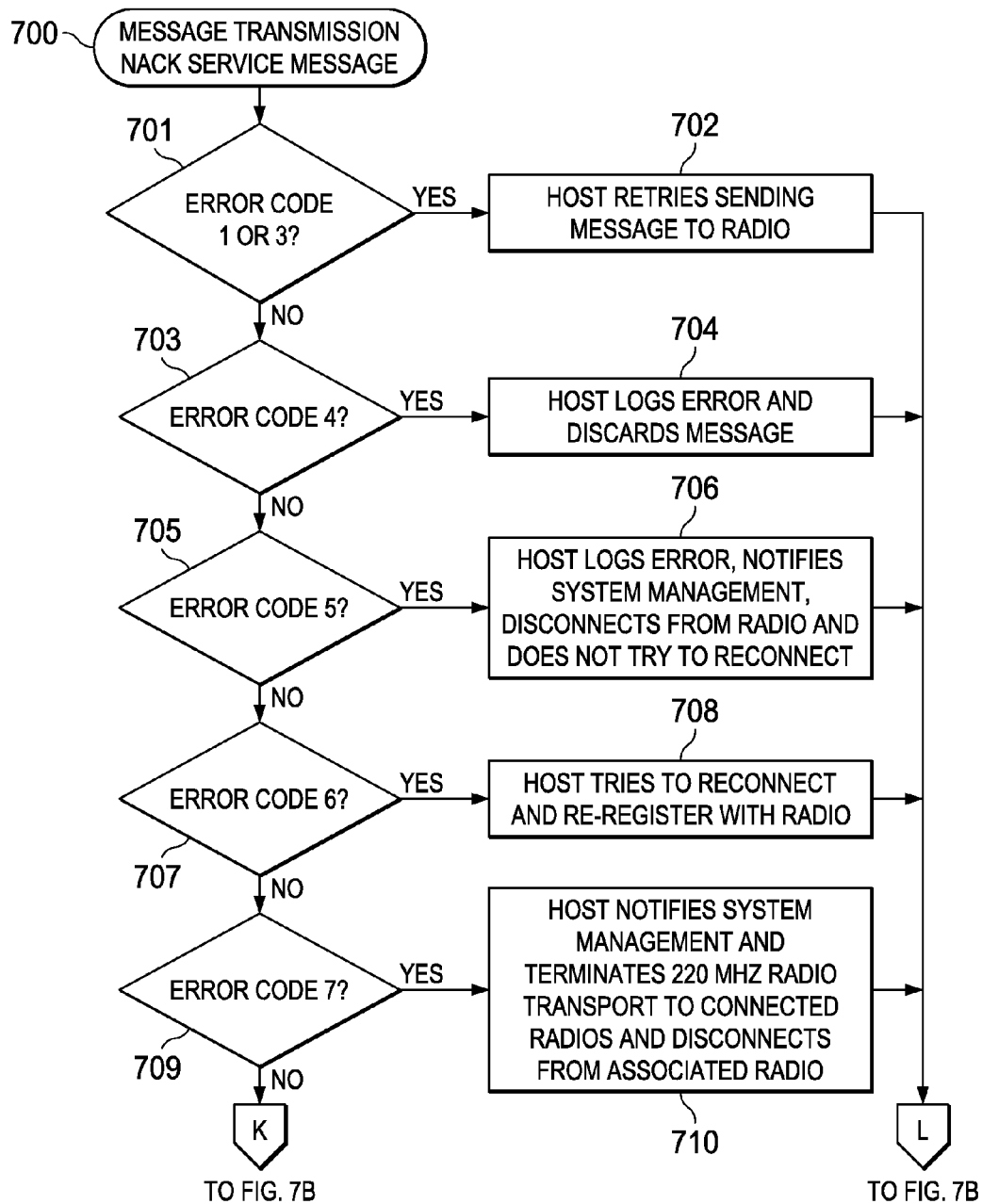
FIGS. 7A-7B are collectively a flow chart of a representative transaction in which a host processes a preferred Message Transmission Nack Service Message received from a radio.
Figure 7B:
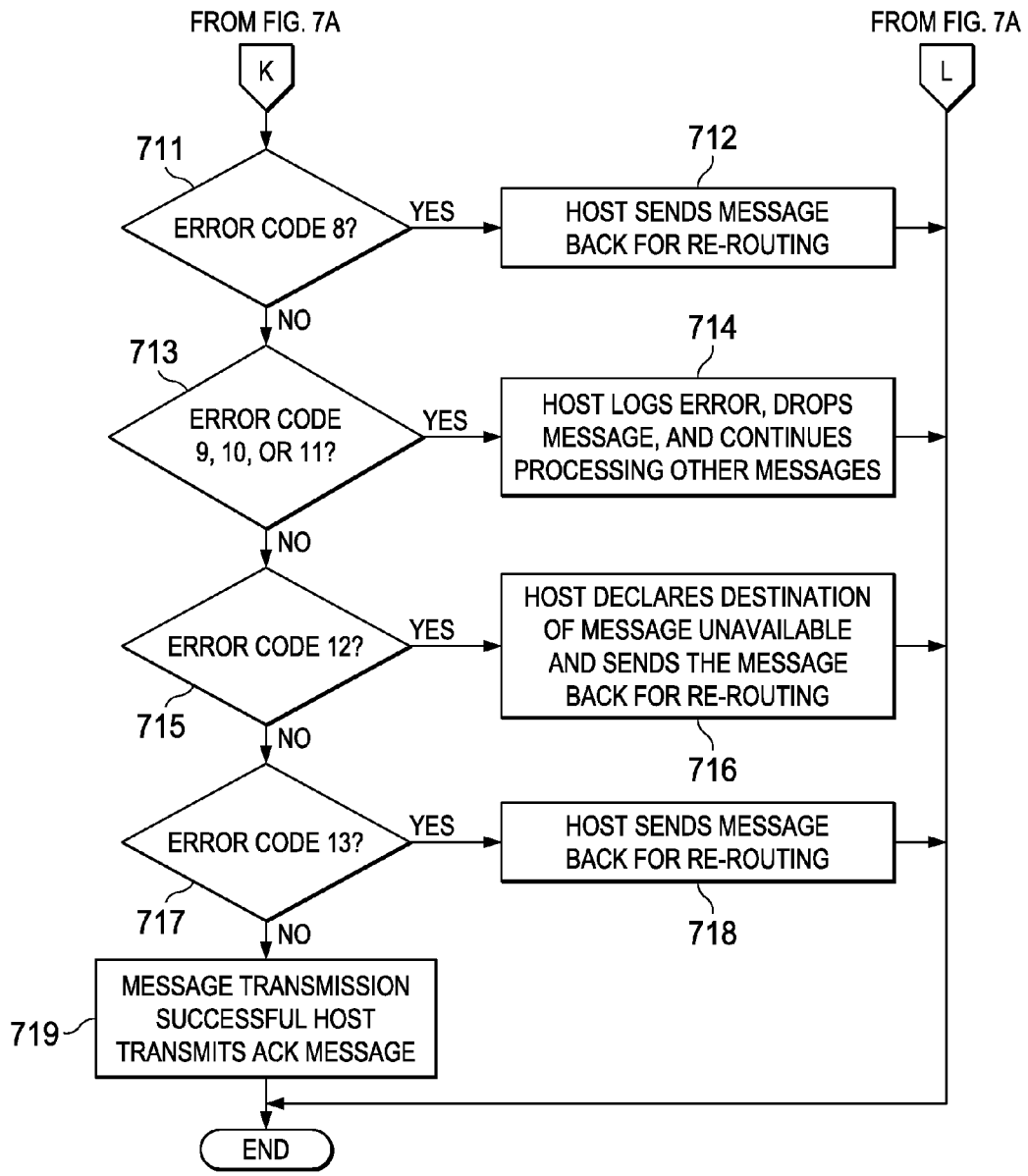

In response to the Message Transmission Nack Service Message, the receiving primary host takes various actions depending on the NACK reason code field. In the preferred HRX embodiment, the receiving host takes the following actions. (In the event of receipt of malformed Transmission Nack Service Message, the primary host logs and reports the error and ignores the message.) A preferred procedure 700 for handling the Message Transmission Nack Service Message at an ELM or CM acting as the associated primary host is shown in FIGS. 7A-7B.

For reason Codes 1 (buffer overflow) and 3 (RF connection unstable), the primary host retries sending the message to the radio (Blocks 701 and 702). For reason Code 4 (TTL expired), the primary host logs and discards the message (Blocks 703 and 704). For reason Code 5 (missing radio ID/missing header date), the primary host disconnects from radio, logs the event and/or notifies system management, and does not try to reconnect to radio (Blocks 705 and 706). For reason Code 6 (not a primary host), the primary host tries to reconnect and re-register with the radio (Blocks 707 and 708).

For a Message Transmission Nack Service Message with a reason Code 7 (radio hardware failure), the primary host alerts system management and terminates the availability of the 220 MHz radio transport entirely by sending TNU disconnects message to all destinations served by the associated radio. The primary host then disconnects from the associated radio and does not try to reconnect again. (Blocks 709 and 710)

For reason Code 8 (slot not wide enough for message), the primary host notifies systems management and then changes the transport preference of the message to "Not 220 MHz Radio" and sends the message back to the ITCM system to be rerouted (Blocks 711 and 712). For reason Codes 9 (unicast message is too long), 10 (broadcast message is too long), and 11 (message is not transmittable), the primary host logs and drops the message and continues processing (sending/receiving) other messages (Blocks 713 and 744).

For reason Code 12 (no connection to intended receiving radio), the primary host declares the destination of the message as unavailable, which means that the ELM or CM acting as the primary host first sends a connection unavailable TNU to the message routers and then sends the message back to the message router to be re-routed (Blocks 715 and 716).

For reason Code 13 (cannot transmit short broadcast), the primary host sets the transport preference of the message to "Not 220 MHz Radio" and sends the message back to the message router to be re-routed. The messages router attempts to send the message via a hardwired IP path if one is available. If an IP path is not available, the message is placed in the retry queue until either an IP connection becomes available or the TTL on the message expires. (Blocks 717 and 718).

In sum, a radio sends Message Transmission Nack Service Message back to the associated host if the radio cannot transmit a message or because of a defect in the triggering message received from the host, with the reason code specifying the cause of the problem.

The preferred structure of the Failover Service Message is shown in Table 11. A radio sends the Failover Service Message to an ELM or CM acting as a backup host when the primary host has de-registered, the primary host has terminated operation unexpectedly, or the link between the radio and primary host is severed. (A primary host should not receive a Failover Service Message. If it does, the primary host logs the event, notifies system management, disconnects from the radio, and reconnects to the radio again.) In the case of a malformed message, the receiving backup host logs and reports the error and ignores the message.

Figure 8:
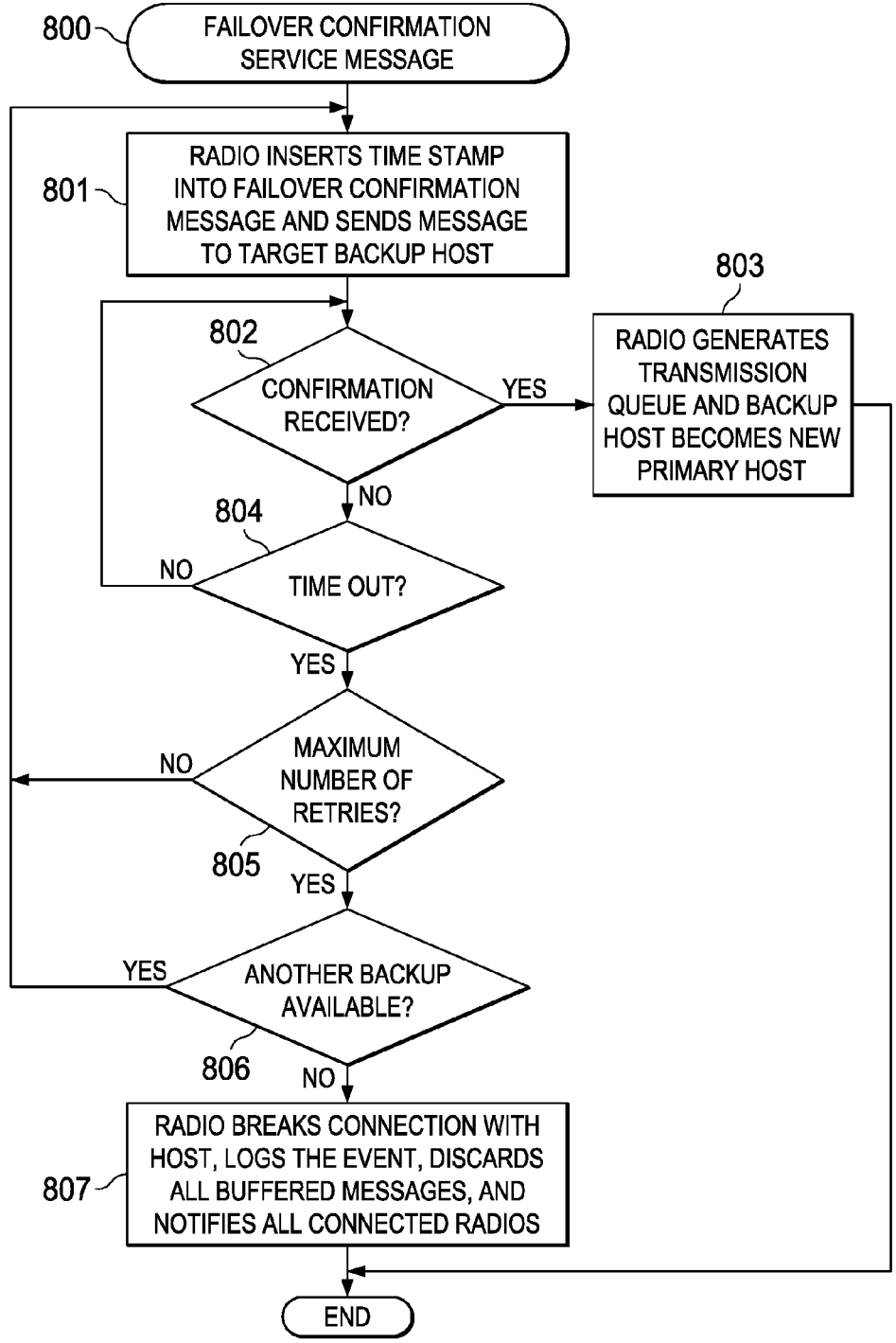
FIG. 8 is a flow chart of a representative failover transaction controlled by a radio using a preferred Failover Confirmation Message.

A preferred transaction 800 using the Failover Confirmation Message is shown in FIG. 8. The radio inserts the time stamp into the time stamp field just before transmission of the Failover Service Message, sends the message, and then waits for a confirmation back from the target backup host (Block 801). The preferred expected wait time for the confirmation message is less than the actual wait time to provide a safety margin. During the wait interval, the radio buffers all messages that are received over the air from other radios.

If a backup host responds with a Failover Confirmation Message in time (Block 802), the radio creates a transmission queue and the new primary host uses the timestamp from the Failover Confirmation Message on the TNU for the transmission queue (Block 803).

If a response from the target backup host does not come back in time (Block 804), the radio tries the same backup host again for a configurable number of times (Block 805). If all retries remain unanswered, the radio breaks its Class D connection to that backup host and tries another backup host, if available (Block 806). If none of the backups respond, then the radio logs the event, discards all messages that may have been received over the air and buffered during the failover process, and notifies all connected radios that they should disconnect and try to connect to another radio (i.e., in the case of a base station radio, such as base station radio 213, the remote radios 200, such as locomotive radio 217 and wayside radio 221, attempt connect to another base station radio).

The preferred structure for the Failover Confirmation Service Message, sent from an ELM or CM acting as a backup host to the host radio in procedure 800 discussed above, is shown in Table 12. In the case of a malformed Failover Confirmation Service Message, the radio logs and reports the error and ignores the message.

As discussed above, the HRX interface handles two types of messages, namely Service Messages and Data Messages. Data Messages differ in structure depending on the direction (i.e., from host to radio or from radio to host).

Figure 9:
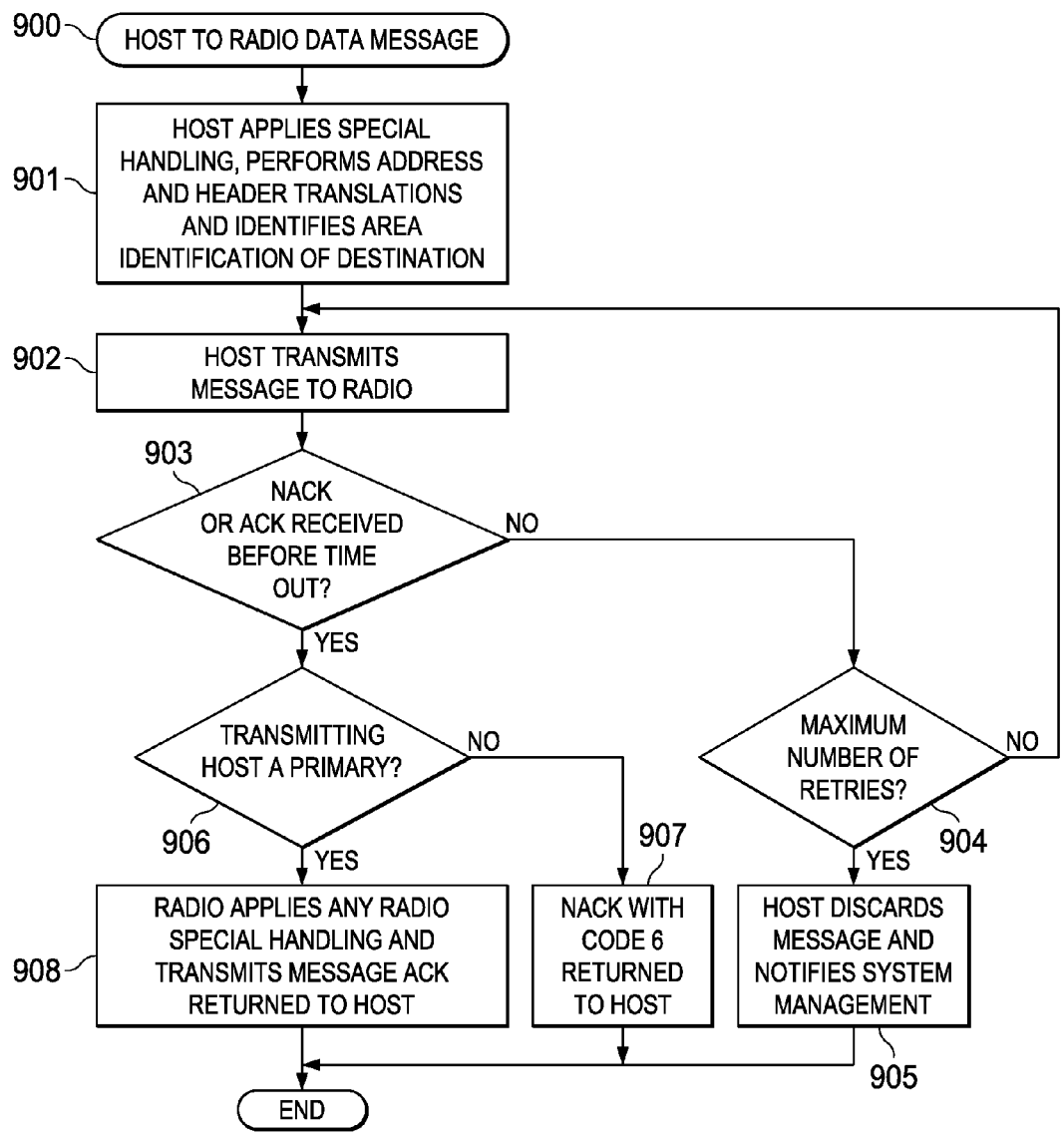
FIG. 9 is a flow chart of a representative transaction using a preferred Host to Radio Data Message.

Table 13 shows the preferred structure of a Host to Radio Data Message, which is triggered when an ELM or CM acting as the primary host is sending a wireless message via the associated radio. FIG. 9 illustrates the typical procedure 900 for handling a Host to Radio Data Message.

At Block 901, the ELM or CM acting as the primary host applies special handling, performs any necessary translation of addresses and headers, identifies the area ID for the area to which the message is to be transmitted. The ELM or CM acting as the primary host sends the message to the associated radio at Block 902.

The primary host keeps the message (i.e., does not discard it) until an ACK is received. If, at Block 903, an ACK or NACK Service Message (discussed above) is not received in time, the primary host tries sending the message again (Block 904). (The retry message preferably has the same message ID as the original one.) If after the maximum number retries, an ACK or NACK Service Message is still not received, the primary host discards the message and notifies the system management (Block 905).

If, the ELM or CM operating as the primary host loses its connection to a radio, it notifies the ITCM system that the destination is not available and that the ITCM system should try sending all messages (including the ones that have been given to the radio but not ACKed yet) through some other mechanism, if possible.

The "Transmission priority" field of the Host to Radio Data Message is for support of fair-share scheduling. For a specific (configurable) SH code for a Host to Radio Message, the slot key field is populated by "compressing" the source routing key. Preferably, this compression algorithm applies only to routing keys whose area type is a wayside, such as wayside area, 218 (rather than a locomotive area or central office area, such as office area 210 or locomotive area 214); therefore, if the area type of the source routing key is not "w", the message is logged and dropped by the host.

Furthermore, the routing key for a wayside interface unit (WIU) must be of the form of w.RR.waysideID.SS, where the wayside ID is a six-digit decimal number commonly referred to as "LLLGGG" and SS is a two-digit number. The summary host must verify that the source routing key meets this standard, and, if it does not, logs and drops the data message.

Once the validation is passed, the slot key is constructed out of the LLLGGG and SS components of the address. In particular, the wayside identifier portion of the source routing key (the LLLGGG part), is inserted into a 32-bit integer structure and shifted left by 7 bits. A bitwise-OR operation is performed on the resulting number with the SS portion of the address such that the SS portion is in the least significant 7-bit position. The 5 most significant bits (bits 27-31) are set to 0. (These bits will be reserved for potential future use.) The resulting 32-bit integer is the slot key. (In the preferred embodiment of the HRX interface, the only message applicable to the slot key is the WIUStatus beacon message, which can be transmitted out of either a wayside radio 200 or a base radio 200, when relaying the wayside status message out of the base.)

Returning to FIG. 9, at Blocks 906 and 907, radio 200 determines that the ELM or CM that is sending the message is not acting as the primary host, the radio returns a NACK Service message with a reason Code 6 to the sending host. Otherwise, at Block 908, the radio applies radio-level special handling (e.g., identifying the slot based on slot key) and transmits the message. When the message is transmitted successfully (or if it failed transmitting), the radio notifies the host by sending an ACK or NACK Service Message, as described above.

In the case of a malformed message, if the message ID field is parsed and known, and the radio returns a NACK Service Message with the reason Code 5 (inconsistent header data), logs and reports the error, and ignores the data message.

For a specific (configurable) SH code, the radio accesses the value of the slot key field and uses the key to look up the FTDMA slot in which to transmit the message, as well the slot parameters, such as the start time and its width. If the slot is not wide enough to transmit the message, the radio returns the error in a NACK service message going back to the primary host.

The radio drops the message if its TTL has expired before the message has been completely transmitted. If the message is dropped, a NACK Service Message is sent to the primary host. However, if for some reason, the radio cannot acquire an accurate time signal from GPS or other sources, it should not apply the TTL logic and the message is not allowed to expire.

Figure 10:
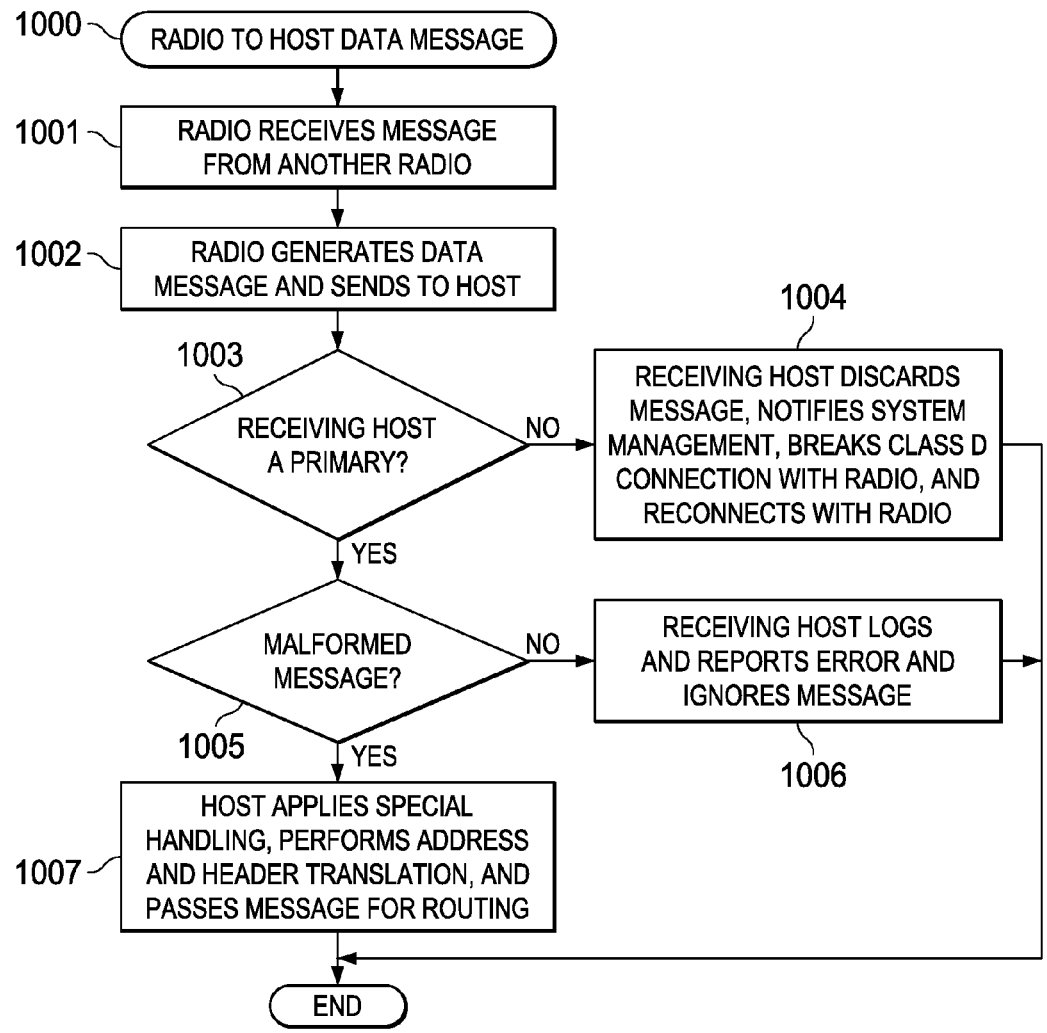
FIG. 10 is a flow chart of a representative transaction using a preferred Radio to Host Data Message.

Table 14 illustrates the structure of a preferred data message from a radio 200 to the associated ELM or CM acting as the primary host. Generally, this message is used when the radio has received a message over the air that must be delivered to the primary host. An exemplary transaction 1000 where a radio transmits a data message to the associated primary host is shown in FIG. 10.

At Block 1001, the radio receives a message from another radio (i.e., the sending radio) over the corresponding wireless link. The sending radio ID may or may not be available to the receiving radio. If it is not known, the receiving radio inserts a "null" value in the sending radio ID field of the data message being sent to the host. In the illustrated embodiment, a value of −1 is used as the null value.

The receiving radio generates the data message and sends to the primary host at Block 1002. If the receiving host is not the primary host, the receiving host discards the message, notifies system management, breaks the Class D connection to the radio, and then reconnects to the radio. (Blocks 1003 and 1004).

If the data message is received by the primary host, but is malformed (Block 1005), the receiving host logs and reports the error and ignores the message (Block 1006). If not, the primary host, at Block 1007, applies any special handling, performs any necessary translation of addresses and headers to determine the routing key needed to route the message from this point on, and sends the message to the ITCM system for routing.

Embodiments of the principles of the present invention support the upgrade of the HRX and/or ELP while the ITCM system is running with minimal impact to communications operations. Generally, these principles are based on high availability and backwards compatibility requirements.

A preferred process for upgrading the HRX and/or ELP software at the central office first is illustrated in the example of Table 15. In this example, a remote radio (e.g. a locomotive radio 217 or wayside radio 221) is connected to the central office a base station radio (e.g., base radio 213). Initially the CM on the remote radio and the ELM in the central office are based on HRX version 1 and ELP version 1 and the remote and base radios are based on HRX version 1, as presented in Step 0 of Table 15.

In order to reduce the number of backwards compatibility tests when upgrading to a new version of the HRX and/or ELP, the backup instance of the ELM in the central office upgrades first to version 2 of the HRX and ELP. The backup ELM then connects to and registers with the base radio, but still operates from version 1 of HRX and ELP, because the base radio is still on HRX version 1, as indicated in Step 1 of Table 15. Once the backup ELM that supports HRX version 2 is registered with the base station radio, the primary ELM is shut down and upgraded to version 2 of the HRX and ELP of the HRX and ELP.

When the primary ELM shuts down, the base radio failsover to the upgraded backup ELM, which becomes the primary, although still operating from HRX version 1 for compatibility with the base station HRX version 1. (The ELP and HRX versions do not have to change at the same time, but is assumed in this example for discussion purposes).

In Step 2 of Table 15, the upgraded original primary ELM is connected to the base radio as a backup ELM, although still operating from HRX version 1 for compatibility with the base station HRX version 1.

In Step 3 of Table 15, the base radio is upgraded to operate at HRX version 2. In order up upgrade to HRX versions, the base station radio must be shut down, upgraded, and then restarted. During this process, no ELM or remote is able to connect to that base radio.

Once step 3 is completed, the primary and backup ELMs can communicate with the base radio using HRX version 2; however, since the remote radio is still running on HRX version 1, the base radio can only obtain HRX version 1 connection parameters over the air from the remote radio. Therefore, the new connection parameters in the HRX version 2 interface between the base radio and the primary ELM are defaulted to "null" values.

In Step 4 of Table 15, the remote area is upgraded to HRX version 2 and ELP version 2, starting with the ITCM system. The CM at the remote area still operates from HRX version 1 to communicate with the remote radio. In Step 5, all components are upgraded to HRX version 2 and ESP version 2 is used across the board.

Table 16 illustrates a preferred process for upgrading from a remote radio first, which may be required since different railroads may upgrade their central office systems at different times. In addition, in some instances an upgraded remote radio may come in contact with an older HRX and/or ELP version operating at the central office. In this example, the initial conditions (Step 0) are the same as discussed above for the case where the central office systems are upgraded first.

The ITCM system in the remote area is upgraded first, but since the remote radio is still running on the older version of the HRX, the CM continues to operate at the older version of HRX (Step 1 of Table 16).

In the next step, the remote radio is upgraded. As a result, the remote area ITCM and the remote radio communicate using HRX version 2; however, since the base radio is still running version 1 of the HRX, the remote radio can only obtain HRX version 1 connection parameters over the air from the base radio. Therefore, the new connection parameters in the HRX version 2 interface between the remote radio and remote messaging is defaulted to "null" values (Step 2 of Table 16).

In a process similar to that described above, the central office HRX and/or ELP is upgraded next, starting with upgrading the backup ELM (Step 3 of Table 16), followed by upgrading the primary ELM (Step 4 of Table 16), and then the base radio (Step 5 of Table 16).

In the two exemplary upgrade processes shown in Tables 15 and 16, the messaging system in an area is upgraded prior to a radio software upgrade, which advantageously reduces the number of required backwards compatibility tests. In addition, the radios do not have to be backwards compatible with the older versions of HRX.

In other words, radios that have been upgraded to the new version of the HRX and/or ELP can interoperate with the hosts (ELMs or CMs) running older versions of HRX, since the hosts are upgraded first. At the same time, base and remote radios are able to interoperate with other radios that are running older versions of HRX and/or ELP. Finally, hosts in the central office and the remotes (ELMs and CMs) are able to interoperate with radios that run older versions of HRX and/or ELP.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

APPENDIX

TABLE 1

| Class D start of message (STX) | Class D header | Class D body (HRX Message) | | Class D ETX |
|---|---|---|---|---|
| | | Message Type ('S' or 'D') 1 byte | HRX Message body | |

TABLE 2

| Service Type (1 byte) | Service Message Body |
|---|---|
| 0 = Reserved | |
| 1 = Registration Request | |
| 2 = Registration Response | |
| 3 = De-register | |

TABLE 2-continued

| Service Type (1 byte) | Service Message Body |
|---|---|
| 4 = Connection Available | |
| 5 = Connection Unavailable | |
| 6 = Message Transmission Ack | |
| 7 = Message Transmission Nack | |
| 9 = Failover | |
| 10 = Failover Confirmation | |

TABLE 3

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 1 |
| HRX Protocol Version | Integer | 1 | The protocol version that the host is planning to use. |
| Class of Service | Bit Mask | 1 | Classes of service that the host is configured to support. |
| Size of the Area ID | Integer | 1 | Size of the Area ID filed |
| Area ID | String | Variable | The Area ID that the host is configured with |
| ELP Version | Integer | 1 | The highest version of ELP that is coded in CM or ELM |

TABLE 6

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 3 |

TABLE 4

| HRX Specs Version | Value of the HRX Protocol Version Field |
|---|---|
| 0.98 | 1 |
| 1.2 | 2 |

TABLE 5

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 2 |
| Registration Result | Char | 1 | 0 = Success<br>1 = Version mismatch error<br>2 = Invalid Class of Service<br>3 = Invalid Area ID<br>4 = Radio hardware Failure<br>5 = Malformed Registration Request<br>6 = Backup host has a lower version of HRX than the primary<br>7 = Backup host has a lower version of ELP than the primary<br>8 = Duplicate registration request with differing registration data sets<br>9 = I am in the failover process. Please come back later!<br>10 = The backup hosts HRX/ELP versions are different from that of other backup hosts |
| Is Primary | Boolean | 1 | 1 = The host is designated to be the primary host.<br>0 = The host is designated to be a backup host. |
| HRX Protocol Version | Integer | 1 | The protocol version that the radio is planning to use. |
| Radio ID | Integer | 4 | The radio ID |
| Timestamp | Long integer | 8 | The time when sending the registration response message. |

TABLE 7

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 4 |
| Class of Service | Bit Mask | 1 | Classes of service that is supported by the host behind the other radio. |
| Size of the Area ID | Integer | 1 | Size of the Area ID filed |
| Area ID | String | Variable | The Area ID of the host behind the other radio |
| Radio ID | Integer | 4 | The ID of the radio that this radio has established a connection with |
| Timestamp | Long integer | 8 | The time when the connection is established. |
| ELP Version | Integer | 1 | The highest version of ELP that is supported in the host behind the other radio. |
| HRX Version | Integer | 1 | The version of HRX that is used between the other radio and its host. |

TABLE 8

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 5 |
| Radio ID | Integer | 4 | The ID of the radio to which the connection is broken |
| Timestamp | Long integer | 8 | The time when the connection is lost. |

TABLE 9

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 6 |
| Message ID | Integer | 4 | The ID of the message that is being acked. |

TABLE 10

| Field Name | Field Data Type | Field Size (bytes) | Description |
|---|---|---|---|
| HRX Message Type | Char | 1 | Indicates if the message is a service or data message, In this case this type would be 'S'. |
| Service Message Type | Char | 1 | 7 |
| Message ID | Integer | 4 | The ID of the message that is being nacked. |
| Nack Reason Code | Integer | 1 | 1 = Buffer Overflow<br>2 =<br>3 = RF Connection Unstable<br>4 = TTL expired<br>5 = Missing Radio ID / Inconsistent header data<br>6 = Not a primary host<br>7 = Radio Hardware Failure<br>8 = Slot is not wide enough for the message.<br>9 = Unicast message is too long<br>10 = Broadcast message is too long<br>11 = Message is not transmittable.<br>12 = There is no connection to the intended receiving radio. Therefore, cannot send a unicast message.<br>13 = Cannot transmit short broadcast (FTDMA) messages because of loss of GPS lock. |

TABLE 11

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 9 |
| Wait time | Integer | 2 | Number of seconds that the radio is going to wait for a confirmation back from the new primary host. |
| Timestamp | Long integer | 8 | The time when the failover message is generated. |

TABLE 12

| Field Name | Field Data Type | Field Size (bytes) | Description |
|---|---|---|---|
| HRX Message Type | Char | 1 | Indicates if the message is a service or data message. In this case this type would be 'S'. |
| Service Message Type | Char | 1 | 10 |

TABLE 13

| Field Name | Field Data Type | Field Size (bytes) | Description |
|---|---|---|---|
| HRX Message Type | Char | 1 | Indicates if the message is a service or data message. In this case, this type would be 'D'. |
| Radio ID | Integer | 4 | Radio ID of destination area of the message |
| Message ID | Integer | 4 | Message ID |
| Special Handling | Integer | 1 | The special handling code |
| Message Priority | Integer | 1 | Message Priority that is transmitted over the air |
| Transmission priority | Integer | 1 | The priority that is used by radio for ordering the transmission of the message. |
| Slot Key | Integer | 4 | The slot key |
| Message Timestamp | long integer | 8 | The time that message was injected into the messaging system. TTL should be counted against this time. |
| TTL | Integer | 2 | The number of seconds since the injection time after which the message will expire. |
| Message Body | Binary Blob | Variable | The body of the message |

TABLE 14

| Field Name | Field Data Type | Field Size (bytes) | Description |
|---|---|---|---|
| HRX Message Type | Char | 1 | Indicates if the message is a service or data message. In this case, this type would be 'D'. |
| Special Handling | Integer | 1 | The special handling code |
| Message Priority | Integer | 1 | Message Priority that was transmitted over the air |
| Sending radio ID | Integer | 4 | The ID of the sending radio, i.e., the ID of the radio that had transmitted the message (for potential future and troubleshooting purposes) |
| Message Body | Binary Blob | Variable | Message Body |

TABLE 15

| | Connection Manager | | Remote Radio | Base Radio | | Primary ELM | | Backup ELM | | |
|---|---|---|---|---|---|---|---|---|---|---|
| Step | ELP | HRX | HRX | HRX primary | HRX backup | HRX | ELP | HRX | ELP | Note |
| 0 | 1 | 1 | 1 | 1 | 1 | 1 | 1 | 1 | 1 | Initial Condition |
| 1 | 1 | 1 | 1 | 1 | 1 | 1 | 1 | 2->1 | 2->1 | Backup ELM downgrades to HRX 1. |
| 2 | 1 | 1 | 1 | 1 | 1 | 2->1 | 2->1 | 2->1 | 2->1 | Both ELMs downgrade. |
| 3 | 1 | 1 | 1 | 2 | 2 | 2 | 2 | 2 | 2 | Base radio uses HRX 2 to communicate with ELM but receives HRX 1 connection parameters from remote radio. |
| 4 | 2->1 | 2->1 | 1 | 2 | 2 | 2 | 2 | 2 | 2 | Since remote radio is still on HRX 1, remote messaging downgrades to HRX 1. |
| 5 | 2 | 2 | 2 | 2 | 2 | 2 | 2 | 2 | 2 | |

TABLE 16

| | Connection Manager | | Remote Radio | Base Radio | | Primary ELM | | Backup ELM | | |
|---|---|---|---|---|---|---|---|---|---|---|
| Step | ELP | HRX | HRX | HRX primary | HRX backup | HRX | ELP | HRX | ELP | Note |
| 0 | 1 | 1 | 1 | 1 | 1 | 1 | 1 | 1 | 1 | Initial Condition |
| 1 | 2->1 | 2->1 | 1 | 1 | 1 | 1 | 1 | 1 | 1 | Remote messaging downgrades to HRX 1. |
| 2 | 2 | 2 | 2 | 1 | 1 | 1 | 1 | 1 | 1 | Remote radio uses HRX 2 to communicate with remote messaging but receives HRX 1 connection parameters from base radio. |
| 3 | 2 | 2 | 2 | 1 | 1 | 1 | 1 | 2->1 | 2->1 | Backup ELM becomes primary and downgrades to HRX 1. |
| 4 | 2 | 2 | 2 | 1 | 1 | 2->1 | 2->1 | 2->1 | 2->1 | Both ELMs downgrade. |
| 5 | 2 | 2 | 2 | 2 | 2 | 2 | 2 | 2 | 2 | |

What is claimed is:

1. A method of exchanging messages between radio of a railroad communications system operating in accordance with a host-radio exchange protocol and a railroad messaging system, comprising:
   transmitting a request by a communications manager of the railroad messaging system to the radio to register as a host of the radio, the communications manager operating in accordance with the host-radio exchange protocol;
   selectively registering the communications manager with the radio as a primary host;
   sending a message from the radio to the primary host identifying an available wireless link between the radio and another radio of the railroad communications system; and
   exchanging data messages between the primary host and the radio in accordance with the host-radio exchange protocol, the data messages including data being exchanged between the primary host and a primary host for the another radio across the wireless link.

2. The method of claim 1, further comprising:
   receiving a subsequent request by another communications manager of the railroad messaging system to register as a host of the radio, the another communications manager operating in accordance with the host-radio exchange protocol; and
   selectively registering the another communications manager with the radio as a backup host.

3. The method of claim 2, further comprising:
   registering the another communications manager as a backup host of the radio if the another communications manager is operating in accordance with a version of the host-radio exchange protocol that is greater than or equal to a version of the host-radio exchange protocol in accordance with which the primary host is operating; and
   rejecting registration of the another communications manager as a backup host of the radio if the another communications manager is operating in accordance with a version of the host-radio exchange protocol that is less than the version of the host-radio protocol accordance with which the primary host is operating.

4. The method of claim 2, wherein the primary host is associated with an area of the railroad communications system and supports a class of service, further comprising:
   registering the another communications manager as a backup host of the radio if the another communications manager is associated with the same area of the railroad communications system associated with the primary host and supports the same class of service as the primary host; and rejecting registration of the another communications manager as a backup host of the radio if at least one of the area associated with another communications manager and the class of service supported by the another communications manager differs from the area of the railroad communications system associated with the primary host and the class of service supported by the primary host.

5. The method of claim 2, wherein the primary host processes data for exchange with the primary host for the another radio in accordance with a link protocol, further comprising:

registering the another communications manager as a backup host with the radio if the another communications manager is operating in accordance with a version of the link protocol greater than or equal to the link protocol version in accordance with which the primary host processes data; and rejecting registration of the another communications manager as a backup host with the radio if the another communications manager is operating in accordance with a version of the link protocol less than the version of the link protocol in accordance with which the primary host processes data.

6. The method of claim 2, further comprising:

if the radio is operating in accordance with a version of the host-radio exchange protocol that is less than a version of the host-radio exchange protocol in accordance with which the primary host is operating, requesting that the primary host operate in accordance with the version of the host-radio exchange protocol in accordance with which the radio is operating.

7. The method of claim 2, further comprising:

failing-over the radio from the primary host to the backup host comprising:

determining that the backup host is operating in accordance with a version of the host-radio exchange protocol higher than a version of the host-radio exchange protocol in accordance with which the primary host is operating; and transmitting through the radio a request to the another radio across the wireless link requesting that the another radio and the primary host of the another radio operate in accordance with the version of the host-radio exchange protocol with which the backuphost is operating.

8. The method of claim 5, further comprising:

failing-over the radio from the primary host to the backup host comprising:

determining that the backup host is operating in accordance with a version of the link protocol higher than a version of the link protocol in accordance with which the primary host is operating; and transmitting through the radio a request to the another radio across the wireless link requesting that the another radio and the a primary host for the another radio operate in accordance with the version of the link protocol with which the backup host is operating.

9. The method of claim 1, further comprising:

in response to the identification of the available wireless link between the radio and another radio:

comparing the configured class of service for the primary host with the configured class of service for the another radio and the primary host for the another radio; and operating the primary host, the another radio, and the primary host for the another radio at the more restrictive class of service.

10. The method of claim 5, further comprising:

in response to the identification of the available wireless link between the radio and another radio:

comparing a version of the link protocol in accordance with which the primary host is operating and a version of the link protocol in accordance with which the primary host of the another radio is operating;

if the version of the link protocol in accordance with which the primary host of the another radio is operating is greater than the version plus two of the link protocol in accordance with which the primary host is operating, logging an error;

if the version of the link protocol in accordance with which the primary host of the another radio is operating is less than the version minus 2 in accordance with which the primary host is operating, logging an error;

if the version of the link protocol in accordance with which the primary host of the another radio is operating is greater than or equal to the version minus 2 of the version of the link protocol in accordance with which the primary host is operating and is less than the version of the link protocol in accordance with which the primary host of the another radio is operating, operation the primary host in accordance with the version with which the primary host of the another radio is operating; and if the version of the link protocol in accordance with which the primary host of the another radio is operating is less than or equal to the version plus 2 of the link protocol in accordance with which the primary host is operating and is greater than or equal to the version in accordance with which the primary host is operating, operating the primary host with the current version of the link protocol in accordance with which the primary host is operating.

11. The method of claim 1, wherein registering the communications manager as the primary host with the radio comprises registering an external link manager interfacing the railroad messaging system at a railroad central office with a base station radio.

12. The method of claim 1, wherein registering the communications manager with the radio as the primary host comprises registering a connection manager interfacing the railroad messaging system at a wayside with the wired communications path with a wayside radio.

13. The method of claim 1, wherein registering the communications manager as the primary host with the radio comprises registering a connection manager interfacing the railroad messaging system onboard a locomotive with a locomotive radio.

14. The method of claim 1, wherein exchanging data messages between the primary host in accordance with the host-radio exchange protocol comprises exchanging data messages across a wired link.

15. A railroad communications system comprising:

a remote radio exchanging messages in accordance with a host-radio exchange protocol with a remote primary host of a remote railroad messaging system over a remote wired link;

a base radio communicating with the remote radio via a wireless link in accordance with a wireless link protocol, the base radio exchanging messages in accordance with the host-radio exchange protocol with a base primary host of a base railroad messaging system over a base wired link, wherein the base radio is operable to:
- identify to the base primary host the availability of the wireless link to the remote radio; and
- exchange data messages with the base primary host over the base wired link in accordance with the host-radio exchange protocol, the data messages including data being exchanged by the base primary host and the remote primary host in accordance with a link protocol across the wireless link using the base radio and the remote radio.

16. The railroad communications system of claim 15, wherein the base radio is further operable to register a backup host of the base railroad messaging system communicating with the base radio over another base wired link.

17. The railroad communications system of claim 16, wherein the base radio is operable to register a backup host operating from a version of the host-radio exchange protocol at least as high as a version of the host-radio exchange protocol from which the base primary host operates.

18. The railroad communications system of claim 16, wherein the base radio is operable to register a backup host operating from a version of the link protocol at least as high as a version of the link protocol from which the base primary host operates.

19. The railroad communications system of claim 15, wherein the base radio is operable to request that the base primary host operate from a lower version of the host-radio exchange protocol when the primary host is operating from a version of the host-radio exchange protocol higher than the version of the host-radio exchange protocol from which the primary host is operating.

20. The railroad communications system of claim 16, wherein the base radio is operable on a fail-over from the primary host to the backup host to message the remote radio and the remote primary host requesting that the remote radio and the remote primary host operate from a version of the host-radio exchange protocol at least equal to the version of the host-radio exchange protocol from which the base backup host operates.

21. The railroad communications system of claim 16, wherein base primary host is operable to:
- compare a configured class of service for the base primary host with a configured class of service for the remote radio and the remote primary host; and
- ensure that the base primary host, the remote radio, and the remote primary host operate at the more restrictive class of service.

22. The railroad communications system of claim 16, wherein the remote radio and the remote primary host are disposed on a locomotive.

23. The railroad communications system of claim 16, wherein the remote radio and the remote primary host are disposed in a wayside.

* * * * *